United States Patent [19]
Kambayashi

[11] Patent Number: 6,157,809
[45] Date of Patent: *Dec. 5, 2000

[54] BROADCASTING SYSTEM, BROADCAST RECEIVING UNIT, AND RECORDING MEDIUM USED IN THE BROADCASTING SYSTEM

[75] Inventor: Toru Kambayashi, Chigasaki, Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/907,091

[22] Filed: Aug. 6, 1997

[30] Foreign Application Priority Data

Aug. 7, 1996 [JP] Japan ................................. 8-208652

[51] Int. Cl.$^7$ ............................... H04N 7/10; H04H 1/00
[52] U.S. Cl. ................................. 455/5.1; 348/7; 348/12; 348/13; 455/6.3
[58] Field of Search ............................. 455/5.1, 6.2, 6.3; 348/6, 7, 10, 12, 13

[56] References Cited

U.S. PATENT DOCUMENTS

| | | | |
|---|---|---|---|
| 4,245,245 | 1/1981 | Matsumoto et al. | 358/122 |
| 5,027,400 | 6/1991 | Baji et al. | 380/20 |
| 5,481,542 | 1/1996 | Logston et al. | 370/94.2 |
| 5,617,565 | 4/1997 | Augenbraun et al. | 395/604 |
| 5,706,437 | 1/1998 | Kirchner | 395/200.12 |
| 5,732,338 | 3/1998 | Schwob | 455/158.5 |
| 5,734,720 | 3/1998 | Salganicoff | 380/20 |
| 5,784,683 | 7/1998 | Sistanizadeh et al. | 455/5.1 |
| 5,872,588 | 2/1999 | Aras et al. | 348/1 |
| 5,880,720 | 3/1999 | Iwafune et al. | 345/327 |
| 5,903,262 | 5/1999 | Ichihashi et al. | 345/327 |

*Primary Examiner*—Thomas G. Black
*Assistant Examiner*—Uyen Le
*Attorney, Agent, or Firm*—Oblon, Spivak, McClelland, Maier & Neustadt, P.C.

[57] ABSTRACT

The present invention provides a broadcasting system which includes a broadcasting unit for broadcasting program information, a reception unit for receiving the program information broadcast by the broadcasting unit, a reproduction section for reproducing a picture from the program information received by the reception unit, a first display unit for displaying the picture reproduced by the reproduction section, an event acquisition section for acquiring regarding the picture displayed on the first display unit, a terminal information holding section for holding terminal information, a server selecting section for acquiring destination information of a broadcasting station server based on the terminal information, a server access section for transmitting an ID of the event acquired by the event acquiring section and the terminal information held in the terminal information holding section to the broadcasting station server through a two-way communication line based on the destination information acquired by the server selecting section, a broadcasting station server for acquiring information data corresponding to the ID of the event and the terminal information both transmitted by the server access section and for transmitting the acquired information data through the two-way communication line based on the terminal information, a server access section for receiving the information data, and a second display unit for displaying the information data received by the server access section on at least part of the picture.

24 Claims, 18 Drawing Sheets

| CHANNEL INFORMATION | DESTINATION INFORMATION OF BROADCASTING STATION SERVER |
|---|---|
| CH1 | AA |
| CH2 | BB |
|  |  |

FIG. 6

{CH1, AREA A, TIME Ta, EVENT ID=a DATA X1a}
{CH1, AREA A, TIME Tb, EVENT ID=b DATA X1b}

{CH1, AREA B, TIME Tg, EVENT ID=g DATA X1g}

{CH2, AREA A, TIME Ta, EVENT ID=2a DATA X2a}

FIG. 7

BROADCASTING SYSTEM, BROADCAST RECEIVING UNIT, AND RECORDING MEDIUM USED IN THE BROADCASTING SYSTEM

BACKGROUND OF THE INVENTION

The present invention relates to a broadcasting system for distributing information to an audience about the contents of a broadcast at audience's request, lessening an amount of access to a broadcasting station from the audience, and controlling the distribution of information from the broadcasting station to the audience in accordance with an amount of the information, a broadcast receiving unit for doing the same, and a recording medium for use in the broadcasting system.

Harmonization between communication and broadcasting has recently been called for, and a VOD (video on demand) service has attracted attention as the forefront of the harmonization. The VOD service is a two-way broadcast service using an existent TV receiver as a video terminal, which allows an audience to watch video information having the same image quality as that of VTR whenever and wherever the audience wishes to do so (on demand). A user sends a signal to a video server of a telephone office through an uplink telephone line and can choose, stop, temporarily stop (pause), rewind video information (e.g., movie) and the like as if he or she operated a VTR at home.

For example, Jpn. Pat. Appln. KOKAI Publication No. 7-321748 discloses a VOD system for providing the VOD service described above. In this VOD system, a program is distributed from a center (CATV corporation) having a video server and the like to a TV system of each audience at audience's request. More specifically, in the VOD system, the video server stores both pictures of programs to be distributed to the audience and detailed information on the contents provided by the programs, thereby distributing the pictures by request of the TV system and the detailed information on the programs. Furthermore, while a program distributed from the center is on the air, detailed information on a designated one of the contents displayed on a TV screen can be displayed thereon.

As described above, conventionally, new, large-scale equipment has to be provided to constitute a two-way broadcasting system including a downlink telephone line through which a picture is transmitted from the center to each audience and an uplink telephone line through which a request signal or a response signal is sent from the audience, in order to achieve the VOD service.

There may be a case where response or request information is temporarily localized on a specific uplink telephone line from each audience to the center to render the telephone line in a so-called hang-up state. To cope with this, fine control for transmitting request and response signals from the audience at different times, cannot be executed. Furthermore, information to be transmitted to each audience from the center according to an audience's request or response, is conventionally multiplexed with a main broadcast signal and then broadcast, so that there is a limit to an amount of transmittable information.

BRIEF SUMMARY OF THE INVENTION

The present invention has been developed in consideration of the above situation. One object thereof is to provide a broadcasting system capable of easily achieving a VOD system using an existent broadcasting system and an existent communication system and easily controlling both dispersion of accesses from an audience to the center and distribution of information from the center to the audience at audience's request in accordance with an amount of information. Another object of the present invention is to provide a broadcast receiving unit for use in the broadcasting system. Still another object of the present invention is to provide a recording medium for use in the broadcasting system.

To attain the above objects, according to a first aspect of the present invention, there is provided a broadcasting system comprising:

broadcasting means for broadcasting program information;

first reception means for receiving the program information broadcast by the broadcasting means;

reproduction means for reproducing a picture from the program information received by the first reception means;

first display means for displaying the picture reproduced by the reproduction means;

event acquisition means for acquiring an event regarding the picture displayed on the first display means;

terminal information holding means for holding terminal information;

terminal information acquisition means for acquiring the terminal information held in the terminal information holding means based on an ID of the event acquired by the event acquisition means;

destination information acquisition means for acquiring destination information of a broadcasting station server based on the terminal information acquired by the terminal information acquisition means;

first transmission means for transmitting both the ID of the event and the terminal information acquired by the terminal information acquisition means to the broadcasting station server through a two-way communication line based on the destination information acquired by the destination information acquisition means;

information data acquisition means for acquiring information data corresponding to the ID of the event and the terminal information both transmitted by the first transmission means;

second transmission means for transmitting the information data acquired by the information data acquisition means through the two-way communication line based on the terminal information;

second reception means for receiving the information data transmitted by the second transmission means; and second display means for displaying the information data received by the second reception means on at least part of the picture.

According to a second aspect of the present invention, in the broadcasting system of the first aspect, the program information comprises main program information indicative of a picture of a program, and sub-program information displayed on at least part of the picture of the program and indicating a picture of a menu of the picture of the program.

According to a third aspect of the present invention, in the broadcasting system of the first aspect, the terminal information comprises channel information of the program information received by the first reception means.

According to a fourth aspect of the present invention, in the broadcasting system of the first aspect, the terminal information comprises return destination information for receiving a return from the broadcasting station server.

According to a fifth aspect of the present invention, in the broadcasting system of the first aspect, the destination information acquisition means comprises a table in which both the terminal information and destination information of the broadcasting station server are stored so as to correspond to each other, and means for acquiring the destination information using the table.

According to a sixth aspect of the present invention, in the broadcasting system of the first aspect, the information data acquisition means comprises a table in which the ID of the event, the terminal information, and the information data are stored so as to correspond to one another, and means for acquiring the information data using the table.

According to a seventh aspect of the present invention, in the broadcasting system of the first aspect, the two-way communication line is a telephone line.

According to an eighth aspect of the present invention, in the broadcasting system of the first aspect, the two-way communication line is an ISDN line.

According to a ninth aspect of the present invention, in the broadcasting system of the first aspect, the event acquisition means acquires the event when a user designates a command button of the picture displayed by the first display means.

According to a tenth aspect of the present invention, in the broadcasting system of the first aspect, the event acquisition means acquires the event when a user designates a predetermined range of the picture displayed by the first display means.

According to an eleventh aspect of the present invention, in the broadcasting system of the first aspect, the first transmission means transmits positional information on the picture designated by a user.

According to a twelfth aspect of the present invention, in the broadcasting system of the eleventh aspect, the information data acquisition means comprises a table in which the ID of the event, the terminal information, the positional information and the information data are stored so as to correspond to one another, and means for acquiring the information data using the table.

According to a thirteenth aspect of the present invention, in the broadcasting system of the first aspect, the destination information acquiring means is a server.

According to a fourteenth aspect of the present invention, there is provided a broadcasting system comprising:

broadcasting means for broadcasting program information including parameter based on standard time of a broadcasting station;

first reception means for receiving the program information broadcast by the broadcasting means;

reproduction means for reproducing a picture from the program information received by the first reception means;

separation means for separating the parameter from the program information received by the first reception means;

first display means for displaying the picture reproduced by the reproduction means;

event acquisition means for acquiring an event regarding the picture displayed on the first display means;

terminal information holding means for holding terminal information;

terminal information acquisition means for acquiring the terminal information held in the terminal information holding means based on an ID of the event acquired by the event acquisition means;

destination information acquisition means for acquiring destination information of a broadcasting station server based on the terminal information acquired by the terminal information acquisition means;

first transmission means for transmitting the ID of the event, the terminal information acquired by the terminal information acquisition means, and the parameter separated by the separation means, to the broadcasting station server through a two-way communication line based on the destination information acquired by the destination information acquisition means;

information data acquisition means for acquiring information data corresponding to the ID of the event, the terminal information, and the parameter transmitted by the first transmission means;

second transmission means for transmitting the information data acquired by the information data acquisition means through the two-way communication line based on the terminal information;

second reception means for receiving the information data transmitted by the second transmission means; and second display means for displaying the information data received by the second reception means on at least part of the picture.

According to a fifteenth aspect of the present invention, there is provided a broadcasting system comprising:

broadcasting means for broadcasting program information including control information;

first reception means for receiving the program information broadcast by the broadcasting means;

reproduction means for reproducing a picture from the program information received by the first reception means;

separation means for separating the control information from the program information received by the first reception means;

event causing means for causing an event based on the control information separated by the separation means;

event acquisition means for acquiring the event caused by the event causing means;

terminal information holding means for holding terminal information;

terminal information acquisition means for acquiring the terminal information held in the terminal information holding means based on an ID of the event acquired by the event acquisition means;

destination information acquisition means for acquiring destination information of a broadcasting station server based on the terminal information acquired by the terminal information acquisition means;

first transmission means for transmitting both the ID of the event and the terminal information acquired by the terminal information acquisition means to the broadcasting station server through a two-way communication line based on the destination information acquired by the destination information acquisition means;

information data acquisition means for acquiring information data corresponding to both the ID of the event and the terminal information transmitted by the first transmission means;

second transmission means for transmitting the information data acquired by the information data acquisition means through the two-way communication line based on the terminal information;

second reception means for receiving the information data transmitted by the second transmission means;

storage means for storing the information data received by the second reception means;

first display means for displaying the picture reproduced by the reproduction means after the information data is stored in the storage means; and second display means for displaying the information data received by the second reception means on at least part of the picture.

According to a sixteenth aspect of the present invention, in the broadcasting system of the fifteenth aspect, the control information separated by the separation means, includes terminal designation information for designating a receiving terminal, the system further comprises first determination means for determining whether the terminal designation information designates a terminal ID stored in advance, and the event causing means causes an event when the first determination means determines that the terminal designation information designates the terminal ID stored in advance.

According to a seventeenth aspect of the present invention, the broadcasting system of the sixteen aspect further comprises:

first updating means for updating a count value when the second transmission means transmits the information data;

second determination means for determining whether the count value updated by the first updating means is equal to or higher than a predetermined value; and second updating means for updating the terminal designation information when the second determination means determines that the updated count value is equal to or higher than a predetermined value.

According to an eighteenth aspect of the present invention, there is provided a broadcasting reception unit comprising:

first reception means for receiving program information;

reproduction means for reproducing a picture from the program information received by the first reception means;

first display means for displaying the picture reproduced by the reproduction means;

event acquisition means for acquiring an event regarding the picture displayed on the first display means;

terminal information holding means for holding terminal information;

terminal information acquisition means for acquiring the terminal information held in the terminal information holding means based on an ID of the event acquired by the event acquisition means;

destination information acquisition means for acquiring destination information of a broadcasting station server based on the terminal information acquired by the terminal information acquisition means;

transmission means for transmitting both the ID of the event and the terminal information acquired by the terminal information acquisition means to the broadcasting station server through a two-way communication line based on the destination information acquired by the destination information acquisition means;

second reception means for receiving information data corresponding to the ID of the event and the terminal information both transmitted by the transmission means; and second display means for displaying the information data received by the second reception means on at least part of the picture.

According to a nineteenth aspect of the present invention, in the broadcasting reception unit of the eighteenth aspect, the program information comprises main program information indicative of a picture of a program, and sub-program information displayed on at least part of the picture of the program and indicating a picture of a menu of the picture of the program.

According to a twentieth aspect of the present invention, in the broadcasting reception unit of the eighteenth aspect, the terminal information comprises channel information of the program information received by the first reception means.

According to a twenty-first aspect of the present invention, in the broadcasting reception unit of the eighteenth aspect, the terminal information comprises return destination information for receiving a return from the broadcasting station server.

According to a twenty-second aspect of the present invention, in the broadcasting reception unit of the eighteenth aspect, the destination information acquisition means comprises a table in which both the terminal information and destination information of the broadcasting station server are stored so as to correspond to each other, and means for acquiring the destination information using the table.

According to a twenty-third aspect of the present invention, in the broadcasting reception unit of the eighteenth aspect, the two-way communication line is a telephone line.

According to a twenty-fourth aspect of the present invention, in the broadcasting reception unit of the eighteenth aspect, the two-way communication line is an ISDN line.

According to a twenty-fifth aspect of the present invention, in the broadcasting reception unit of the eighteenth aspect, the event acquisition means acquires the event when a user designates a command button of the picture displayed by the first display means.

According to a twenty-sixth aspect of the present invention, in the broadcasting reception unit of the eighteenth aspect, the event acquisition means acquires the event when a user designates a predetermined range of the picture displayed by the first display means.

According to a twenty-seventh aspect of the present invention, in the broadcasting reception unit of the eighteenth aspect, the transmission means transmits positional information on the picture designated by a user.

According to a twenty-eighth aspect of the present invention, there is provided a broadcasting reception unit comprising:

first reception means for receiving program information including parameter based on standard time of a broadcasting station;

reproduction means for reproducing a picture from the program information received by the first reception means;

separation means for separating the parameter from the program information received by the first reception means;

first display means for displaying the picture reproduced by the reproduction means;

event acquisition means for acquiring an event regarding the picture displayed on the first display means;

terminal information holding means for holding terminal information;

terminal information acquisition means for acquiring the terminal information held in the terminal information holding means based on an ID of the event acquired by the event acquisition means;

destination information acquisition means for acquiring destination information of a broadcasting station server based on the terminal information acquired by the terminal information acquisition means;

first transmission means for transmitting the ID of the event, the terminal information acquired by the terminal information acquisition means, and the parameter separated by the separation means, to the broadcasting station server through a two-way communication line based on the destination information acquired by the destination information acquisition means;

second reception means for receiving information data corresponding to the ID of the event, the terminal information, and the parameter transmitted by the first transmission means; and second display means for displaying the information data received by the second reception means on at least part of the picture.

According to a twenty-ninth aspect of the present invention, there is provided a storage medium having program code instructions stored thereon when executed by a processor, the instructions comprising:

means for causing the processor to reproduce a picture from program information;

means for causing the processor to display the reproduced picture;

means for causing the processor to acquire an event regarding the displayed picture;

means for causing the processor to acquire terminal information based on an ID of the acquired event;

means for causing the processor to acquire destination information of a broadcasting station server based on the acquired terminal information; and means for causing the processor to transmit the ID of the event and the terminal information to the broadcasting station server through a two-way communication line based on the acquired destination information.

According to a thirtieth aspect of the present invention, there is provided a storage medium having program code instructions stored thereon when executed by a processor, the instructions comprising:

means for causing the processor to acquire information data corresponding to an ID of an event and terminal information; and means for causing the processor to transmit the information data to a terminal through a two-communication line based on the terminal information.

According to a thirty-first aspect of the present invention, there is provided a storage medium having program code instructions stored thereon when executed by a processor, the instructions comprising:

means for causing the processor to reproduce a picture from program information including parameters based on standard time of a broadcasting station;

means for causing the processor to separate the parameters from the program information;

means for causing the processor to display the reproduced picture;

means for causing the processor to acquire an event regarding the displayed picture;

means for causing the processor to acquire terminal information based on an ID of the acquired event;

means for causing the processor to acquire destination information of a broadcasting station server based on the acquired terminal information; and means for causing the processor to transmit the ID of the event, the acquired terminal information, and the separated parameters to the broadcasting station server through a two-way communication line based on the acquired destination information.

According to a thirty-second aspect of the present invention, there is provided a storage medium having program code instructions stored thereon when executed by a processor, the instructions comprising:

means for causing the processor to acquire information data corresponding to parameters based on an ID of an event, terminal information, and reference time of a broadcasting station; and means for causing the processor to transmit the acquired information data to a terminal through a two-way communication line based on the terminal information.

According to a thirty-third aspect of the present invention, there is provided a storage medium having program code instructions stored thereon when executed by a processor, the instructions comprising:

means for causing the processor to reproduce a picture from program information including control information;

means for causing the processor to separate the control information from the program information;

means for causing the processor to cause an event to occur based on the separated control information;

means for causing the processor to acquire the event;

means for causing the processor to acquire terminal information based on an ID of the event;

means for causing the processor to acquire destination information of a broadcasting station server based on the terminal information;

means for causing the processor to transmit both the ID of the event and the terminal information to the broadcasting station server through a two-way communication line based on the destination information;

means for causing the processor to store-information data corresponding to the ID of the event and the terminal information;

means for causing the processor to display the reproduced picture after the information data is stored; and means for causing the processor to display the stored information data on at least part of the picture.

According to a thirty-fourth aspect of the present invention, in the storage medium of the thirty-third aspect, the control information includes terminal designation information for designating a receiving terminal; the instructions further comprises means for causing the processor to determine whether the terminal designation information designates a terminal ID stored in advance; and the event causing means causes the processor to cause an event to occur when the processor determines that the terminal designation information designates the terminal ID stored in advance.

According to a thirty-fifth aspect of the present invention, there is provided a storage medium having program code instructions stored thereon when executed by a processor, the instructions comprising:

means for causing the processor to acquire information data corresponding to an ID of an event and terminal information; and means for causing the processor to transmit the information data to a terminal through a two-way communication line based on the terminal information.

According to a thirty-sixth aspect of the present invention, in the storage medium of the thirty-fifth aspect, the instructions further comprises:

means for causing the processor to update a count value when the information data is transmitted;

means for causing the processor to determine whether the updated count value is not less than a predetermined value; and means for causing the processor to update the terminal designation information when it is determined that the updated count value is not less than a predetermined value.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a table representing channel information stored in a server selecting section of the network access device and its corresponding destination information of a broadcasting station server;

FIG. 7 is a view of information stored and controlled in a program database of the broadcasting station server;

DETAILED DESCRIPTION OF THE INVENTION

Embodiments of the present invention will now be described with reference to the accompanying drawings.
(First Embodiment)

Figure 1:
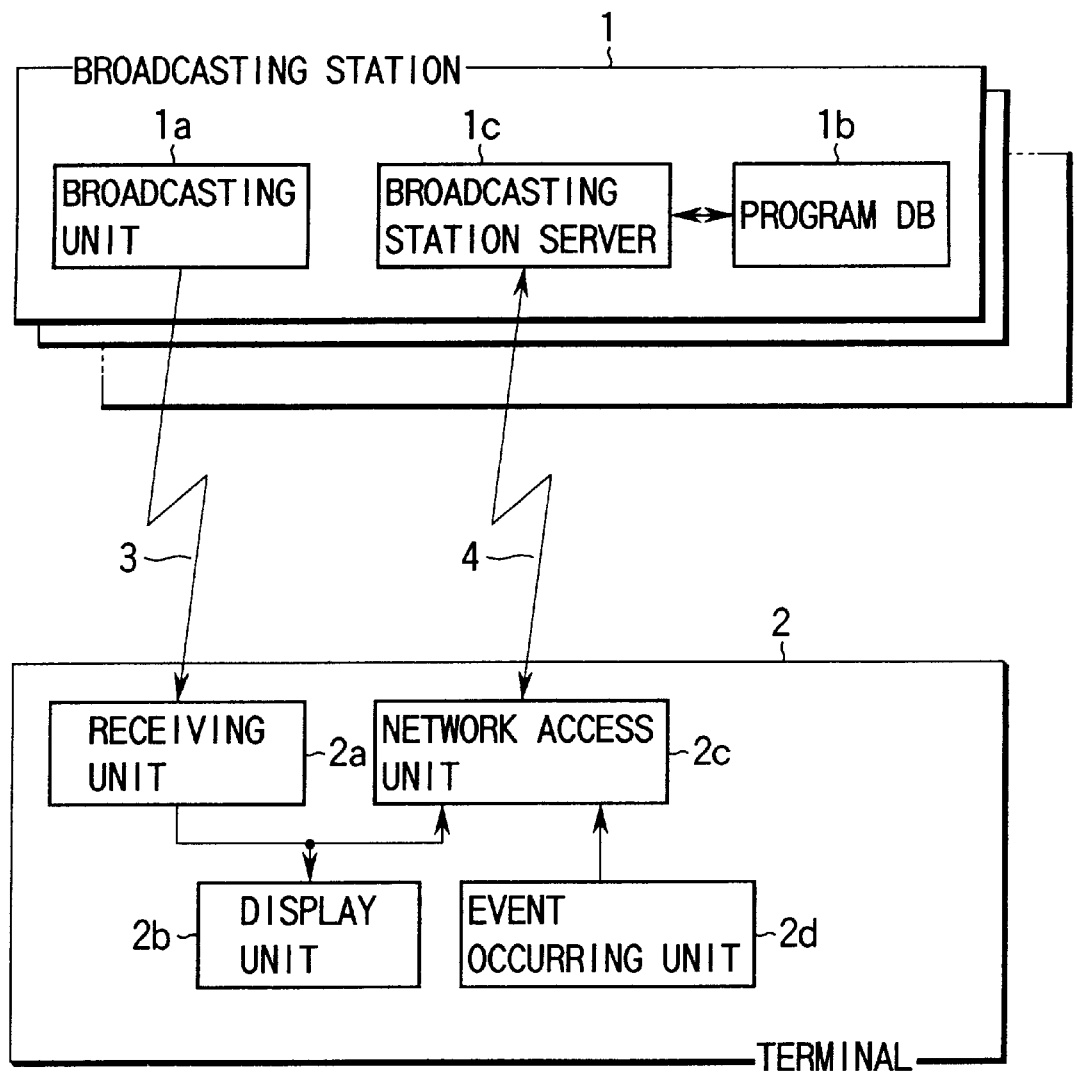
FIG. 1 is a block diagram showing the entire broadcasting system according to a first embodiment of the present invention.

FIG. 1 is a block diagram of the whole broadcasting system according to a first embodiment of the present invention. As illustrated in FIG. 1, the main part of a broadcasting station 1 of a broadcasting corporation (terrestrial-wave TV, CATV, satellite broadcasting, etc.) of an existent video service, comprises a broadcasting unit 1a, a program DB (database) 1b, and a broadcasting station server 1c. The broadcasting unit 1a includes units for storing, exchanging and transferring video programs in order to distribute them to each audience by radio or wire communication. The program database 1b stores information corresponding to events occurring based on the contents of the programs distributed to the audience. The broadcasting station server 1c reads information, which corresponds to an event notified from a receiving terminal 2 of the audience, from the program database 1b, and sends it to the receiving terminal 2 of the event notification originator. The program database 1b and broadcasting station server 1c are provided for each broadcasting station 1.

The main part of the receiving terminal 2 includes a receiving unit 2a, a display unit 2b, a network access unit 2c, and an event occurring unit 2d. The receiving unit 2a selectively receives a video signal of the video program distributed from the broadcasting station 1 and reproduces a video image from the video signal. The display unit 2b displays the video image reproduced by the receiving unit 2a and information received by the network access unit 2c. The event occurring unit 2d causes an event to occur by operating a pointing device of a mouse or the like by the audience in accordance with the contents displayed on the display unit 2b, and then notifies it to the network access unit 2c. The network access unit 2c acquires the event notified from the event occurring unit 2d, notifies it to the broadcasting station server 1c through a two-way communication line 4. If the unit 2c receives a reply to the event notification from the broadcasting station server 1c through the two-way communication line 4, it is displayed on the display unit 2b.

An information transmission path 3 is a one-way transmission path (from broadcasting station 1 to receiving terminal 2) through which a large number of video signals to be broadcast by the broadcasting unit 1a of the broadcasting station 1 are distributed. The communication line 4 is a two-way information network line such as a telephone line and an ISDN line, the band of which is narrower than that of the information transmission path 3. The communication line 4 is set in the broadcasting station 1 and audience's house by a call from the receiving unit 2a and can be formed, for example, by connecting the broadcasting station 1 and audience's house through an internet.

Figure 2:
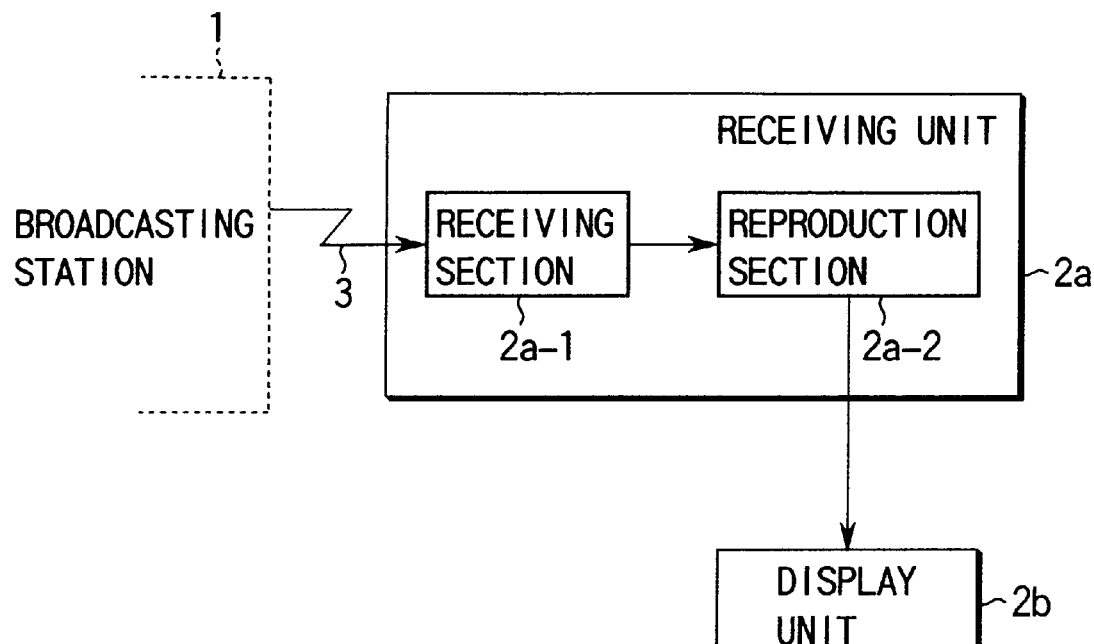
FIG. 2 is a block diagram of a receiving unit of a receiving terminal.

FIG. 2 illustrates the receiving unit 2a of the receiving terminal 2. The unit 2a includes a receiving section 2a-1 and a reproduction section 2a-2. The receiving unit 2a-1 receives a video signal (VHF, UHF, CATV, NTSC, MPEG1, MPEG2, etc.) from the broadcasting unit 1a of the broadcasting station 1 according to its characteristic, and then transmits it to the reproduction unit 2a-2. The reproduction unit 2a-2 reproduces the video signal received by the receiving section 2a-1 according to its characteristic, and then sends it to the display unit 2b.

Figure 3:
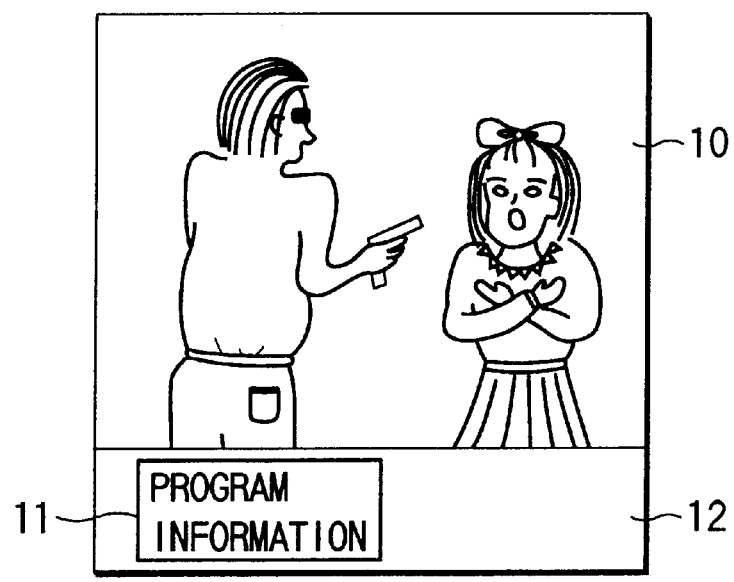
FIG. 3 is a view illustrating an example of a picture reproduced and displayed on a display device of the receiving terminal.

FIG. 3 shows an example of a video image reproduced and displayed on the display unit 2b. As shown in this figure, the reproduced image is constituted of a main picture 10 of the main program and sub-picture 12 of the menu related to the main program and listing a command button 11 selectable by the audience. The sub-picture 12 is formed long under the main picture 10.

A video signal of the sub-picture 12 (referred to as a sub-video signal hereinafter) can be added to that of the main picture 10 (referred to as a main video signal hereinafter) in the broadcasting station 1 and then distributed. The sub-video signal is multiplexed with part of a vertical blanking period, which is a time interval in the main video signal, in the form of a digital signal in the broadcasting unit 1a, and then distributed. Upon receiving the video signal, the receiving unit 2a reproduces a sub-video signal by a decoder which is provided in advance. The reproduced sub-picture is displayed, together with the reproduced main picture, as illustrated in FIG. 3. If a desired command button (e.g., "program information" in FIG. 3) is selected from the menu displayed as the sub-picture 12 by operating a mouse provided for the receiving unit 2, an event corresponding to the selected command button will occur.

Figure 4:
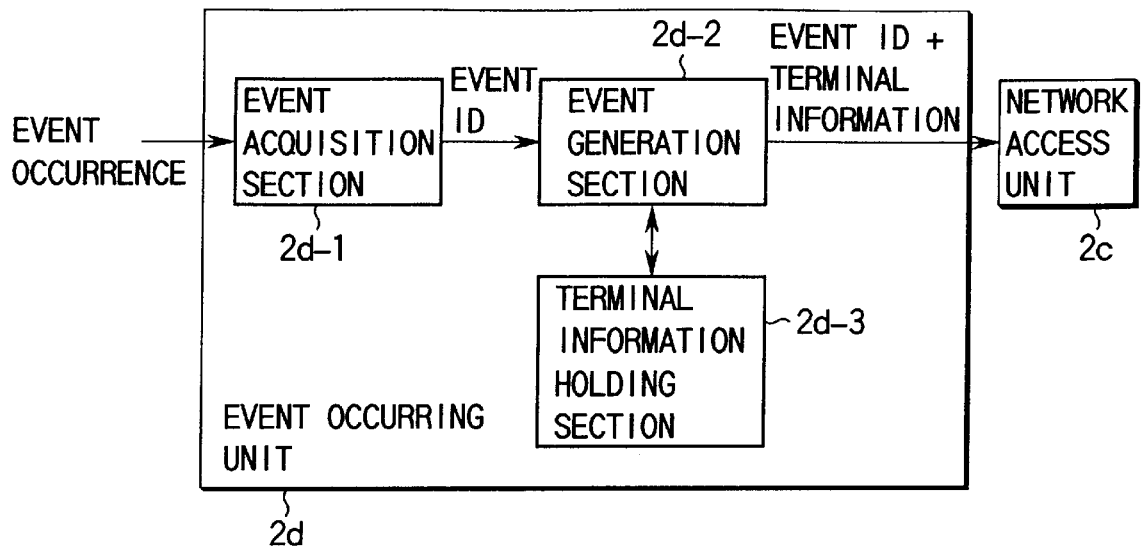
FIG. 4 is a block diagram of an event occurring device of the receiving terminal.

FIG. 4 is a block diagram showing the event occurring unit 2d. The unit 2d includes an event acquisition section 2d-1, an event generation section 2d-2, and a terminal information holding section 2d-3.

When the event acquisition section 2d-1 detects that a user (audience) of the receiving terminal 2 clicks a desired command button of, e.g., the menu shown in FIG. 3, it detects that an event occurs and notifies the event generation section 2d-2 of identification information (event ID) of the detected event.

The terminal information holding section 2d-3 holds band (channel) information selected by the user and currently received by the receiving unit 2a, standard time (terminal time) which is a base of an operation of the receiving terminal 2, identification information (terminal ID) which is proper to and assigned to each receiving terminal 2 at the time of manufacture, and information (terminal information) indicative of a location of the receiving terminal 2, etc., registered by the user. The section 2d-3 may hold a return destination information such as an IP address in order to receive a return from the broadcasting station 1.

Upon receiving the event ID from the event acquisition section 2d-1, the event generation section 2d-2 reads terminal information such as the currently-selected channel information, the terminal ID of the receiving terminal 2, the present time (terminal time) and location, and the return destination (self-terminal) out of the event acquisition section 2d-2, and the event ID is added to the terminal information and then sent it to the network access device 2c.

Figure 5:
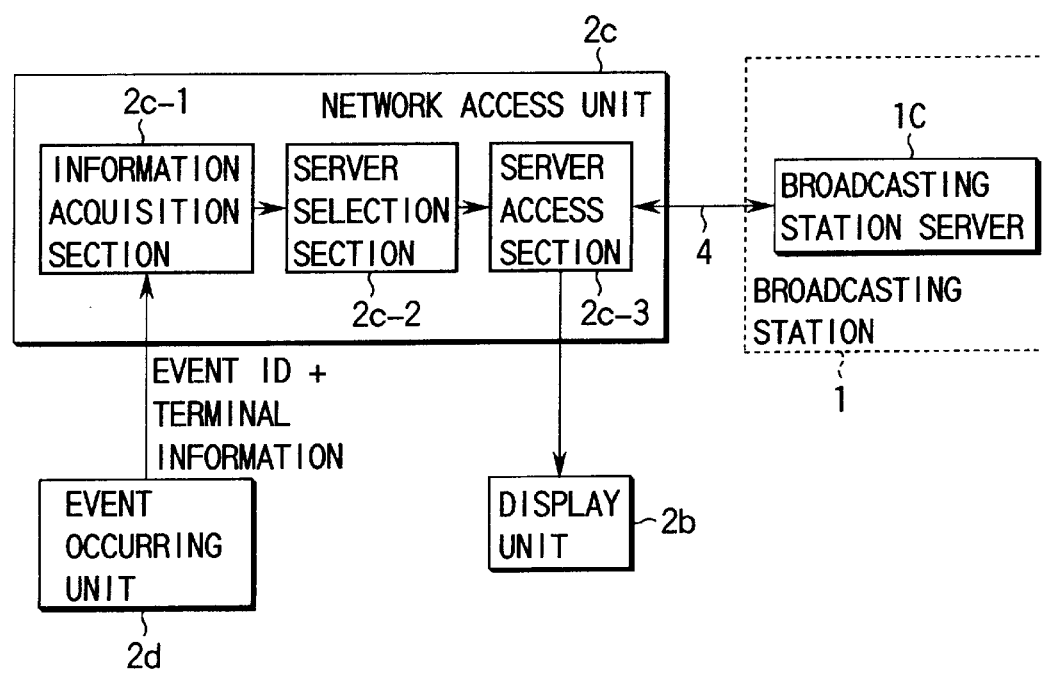
FIG. 5 is a block diagram of a network access device of the receiving terminal.
Figure 8:
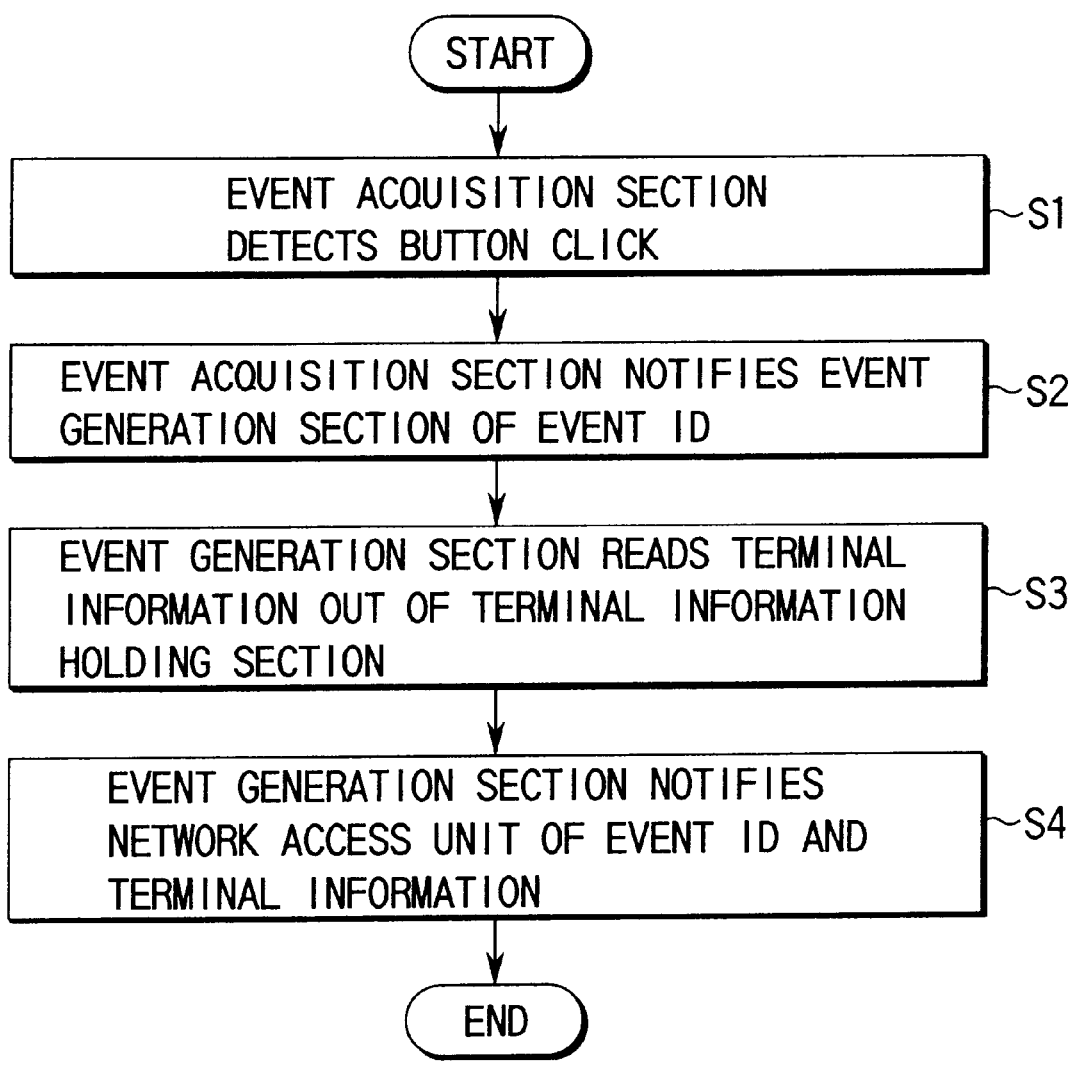
FIG. 8 is a flowchart of a processing operation of the event occurring device in order to explain a series of operations of the broadcasting system according to the first embodiment of the present invention.

FIG. 5 is a block diagram showing the network access unit 2c. This unit 2c includes an information acquisition section 2c-1, a server selection section 2c-2, and a server access section 2c-3.

Upon receiving the event ID and terminal information from the event occurring unit 2d, the information acquisition section 2c-1 supplies them to the server selection section 2c-2.

As illustrated in FIG. 6, the server selection section 2c-2 has a table for storing channel information and address information of a broadcasting station server corresponding thereto. The section 2c-2 retrieves the destination information, referring to the table of FIG. 6, based on the channel information of the terminal information supplied from the information acquisition section (2c-1), and supplies the destination information to the server access section 2c-3, together with the event ID and terminal information.

The "destination information of broadcasting station server" controlled by the table of FIG. 6 has only to be information necessary for making a connection with the broadcasting station server 1c through the communication line 4 or address information necessary for transferring information or an IP address required for accessing to an internet.

The server access section 2c-3 accesses to the broadcasting station server 1c selected via the communication line 4 and sends the event ID and terminal information thereto. The section 2c-3 also receives information from the server 1c via the communication line 4 and then supplies it to the display unit 2b.

FIG. 7 is a view of information stored in and controlled by the program database 1b of the broadcasting station server 1c provided for every broadcasting station.

As illustrated in FIG. 7, if there are a plurality of broadcasting channels, information data corresponding to an event ID capable of occurring based on a picture of a program to be broadcast in a broadcasting area in correspondence with time at which the picture is distributed, is stored in the form of a list for each of the channels. If there are broadcasting areas (e.g., area A, area B) of different programs when the channels are the same, the above information data is stored in the form of a list for each of the areas.

Assume that a user chooses the command button 11 to cause the program information acquisition event of FIG. 3 to occur when a commercial message is broadcast. The commercial message may depend on a location of the receiving terminal 2. If, however, the receiving terminal 2 sends information of its location as terminal information when it notifies the event, the broadcasting station server 1c is able to acquire appropriate information about a picture of the commercial message from the program database 1b using the information as a retrieval key.

As shown in FIG. 7, the information data stored in the program database 1b in correspondence with the channel, area, event ID, distribution time, etc., can be information of access to another broadcasting station server. When the access information is sent to the other broadcasting station server, the network access unit 2 of the receiving terminal 2 can be connected to another broadcasting station server to receive proper information therefrom.

In FIG. 7, a picture of a program to be broadcast is caused to correspond to the event ID using time when the picture is distributed. The present invention is not limited to this. For example, the time can be replaced with a frame number of the picture.

If the broadcasting station server 1c is notified of the event ID and terminal information by accessing thereto from the network access unit 2c through the communication line 4, it retrieves the program database 1b using channel information, terminal time and event ID contained in the terminal information as keys. The program database 1b stores in advance information data to be extracted when the channel information, terminal time and event ID are designated. If the broadcasting station server 1c retrieves the program database 1b and reads information data corresponding to the designated event, it transmits the information data to the receiving terminal 2, designated by return destination information included in the terminal information, through the communication line 4.

A series of processing operations of the broadcasting system illustrated in FIG. 1, will now be described with reference to the flowcharts of FIGS. 8 to 11.

When one of a number of programs broadcast by the plural broadcasting stations 1, selected by an audience, is received by the receiving unit 2a, a picture as shown in FIG. 3 is displayed on the display unit 2b, as described above. If the audience using the receiving terminal 2 clicks the command button "program information" in the menu shown in FIG. 3, the event acquisition section 2d-1 of the event occurring unit 2d detects that an event occurs (step S1 of FIG. 8) and then notifies the event generation section 2d-2 of an event ID corresponding to the command button "program information" (step S2).

If the event generation section 2d-2 is notified of the event ID, it reads channel information, terminal time, terminal ID, terminal location, return destination (self-terminal) information, etc. of the currently-received program from the terminal information holding section 2d-3 (step S3), and notifies the network access unit 2c of the read terminal information and event ID. The flow advances to step S10 of FIG. 9.

If the information acquisition section 2c-1 of the network access unit 2c receives the event ID and terminal information from the event occurring unit 2d (step S10 of FIG. 9), the server selection section 2c-2 selects the broadcasting station server 1c to be accessed from the table of FIG. 6 on the basis of the channel information contained in the terminal information to obtain destination information of the server 1c (step S11).

The server access section 2c-3 accesses to the selected broadcasting station server 1c based on the destination information obtained from the server selection section 2c-2 and transmits the event ID and terminal information through the communication line 4 (step S12). The flow goes to step S20 of FIG. 11.

Upon receiving the event ID and terminal information from the network access unit 2c of the receiving terminal 2 through the communication line 4 (step S20 of FIG. 11), the broadcasting station server 1c of the broadcasting station 1 retrieves the program database using them as keys (step S21) and reads information corresponding to the event ID and matching the terminal information of the receiving terminal 2 of the event notification originator (step S22).

The broadcasting station server 1c transmits information data read out of the program database 1b to the receiving terminal 2 designated by the return destination information contained in the terminal information through the communication line 4 (step S23). The flow advances to step S30 of FIG. 10.

The network access unit 2c of the receiving terminal 2 receives information from the broadcasting station server 1c via the communication line 4 (step S30 of FIG. 10) and then sends it to the display unit 2b. Thus, the information transmitted from the server 1c is displayed on the display unit 2b (step S31).

Figure 12:
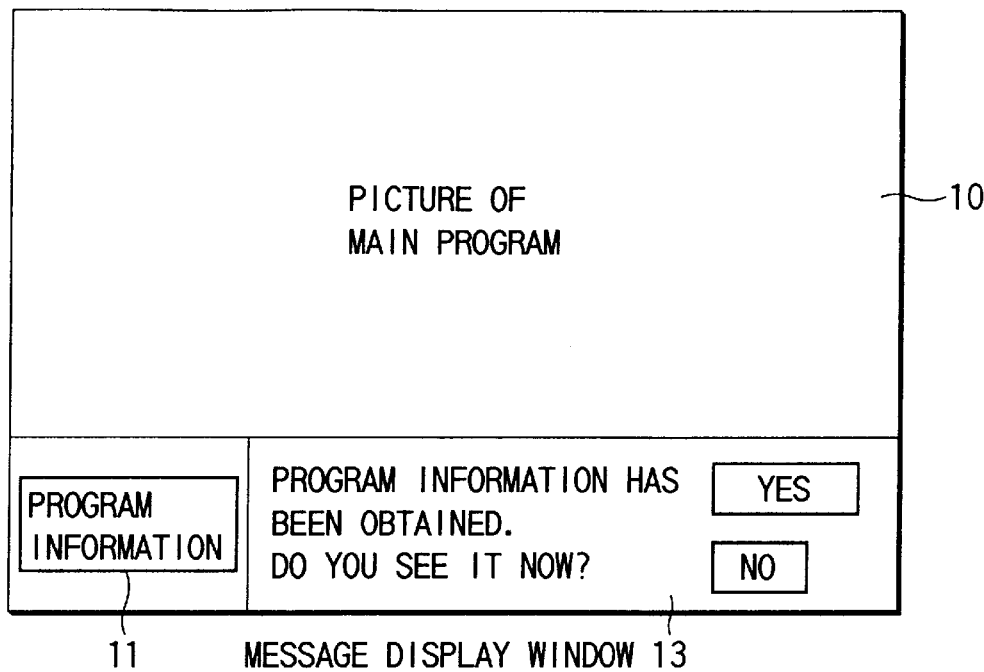
FIG. 12 is a view illustrating an example of information transmitted from the broadcasting station server and displayed by the display device of the receiving terminal.

FIG. 12 shows an example of information transmitted from the broadcasting station server 1c and displayed on the display unit 2b in step S31.

The audience using the receiving unit 2 shown in FIG. 1 chooses the command button 11 shown in FIG. 3 and clicks the mouse to operate the broadcasting system of FIG. 1 in accordance with the flowcharts of FIGS. 8 to 11. Thus, the display unit 2b receives desired information from the broadcasting station server 1c.

Figure 13:
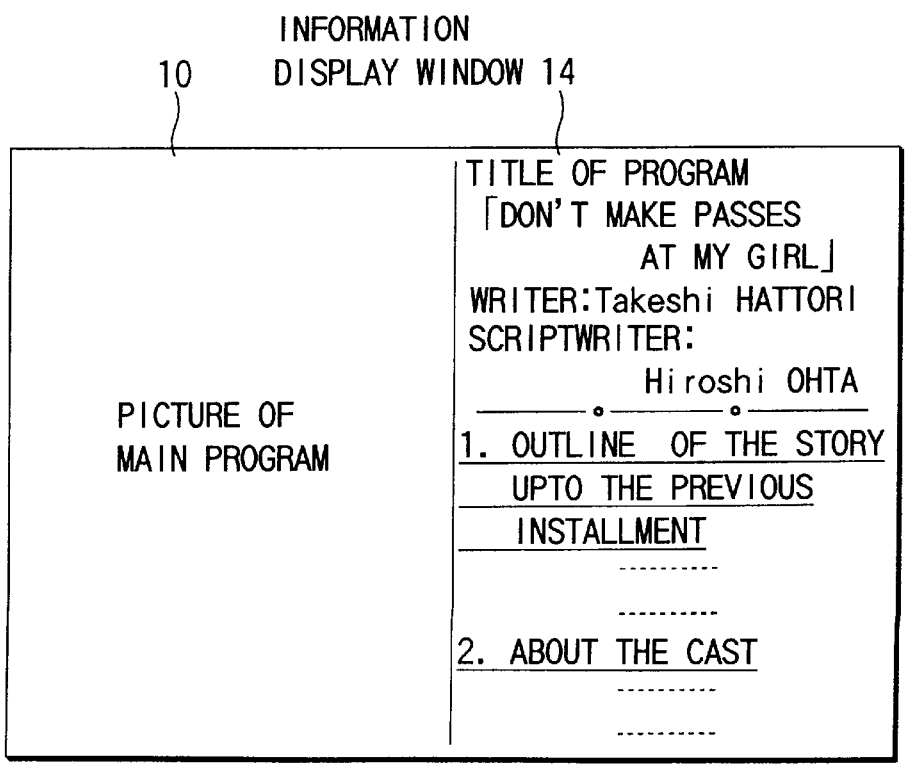
FIG. 13 is a view illustrating an example of information transmitted from the broadcasting station server and displayed by the display device of the receiving terminal.

First, as shown in FIG. 12, a message display window 13 is opened under the main picture 10 and next to the command button 11, and the window 13 displays, for example, a message "We have obtained Program information. Do you see it now?" and command buttons indicating "YES" and "NO". If the audience clicks the command button of "YES", the screen of the display unit 2b is divided to open an information display window 14 next to the main picture 10, as shown in FIG. 13. This window 14 displays information (program information) which has been received from the broadcasting station server 1c. In FIG. 13, the left-hand screen is a broadcast one displaying the main picture, while the right-hand screen is a network access one displaying information received from the broadcasting station server 1c.

The information acquired from the server 1c is stored in advance in a memory device of the receiving terminal 2 such that the audience can see the program information any time even when the audience clicks the button of "NO" on the display screen of FIG. 12 (i.e., when the audience does not wish to see the program information at once).

As described above, according to the first embodiment of the present invention, the VOD system can easily be achieved using the existent broadcasting system and communication system. As compared with a conventional VOD system wherein information is always multiplexed with a video signal of the main picture and distributed to each audience from the broadcasting station, the VOD system of the present invention can easily provide a convenient service for the audience.

(Second Embodiment)

Figure 14:
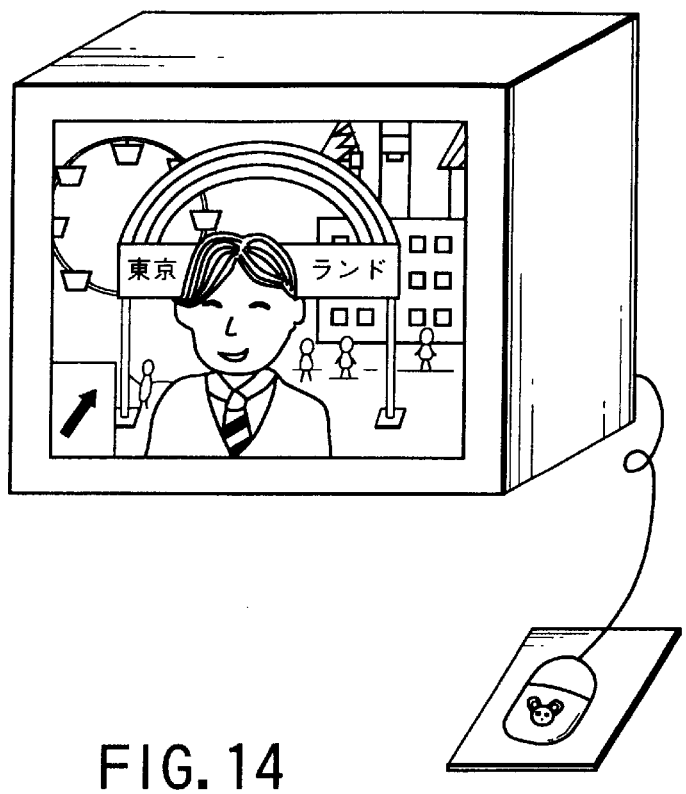
FIG. 14 is a view showing a picture reproduced by a display device of a receiving terminal of a broadcasting system according to a second embodiment of the present invention.
Figure 16:
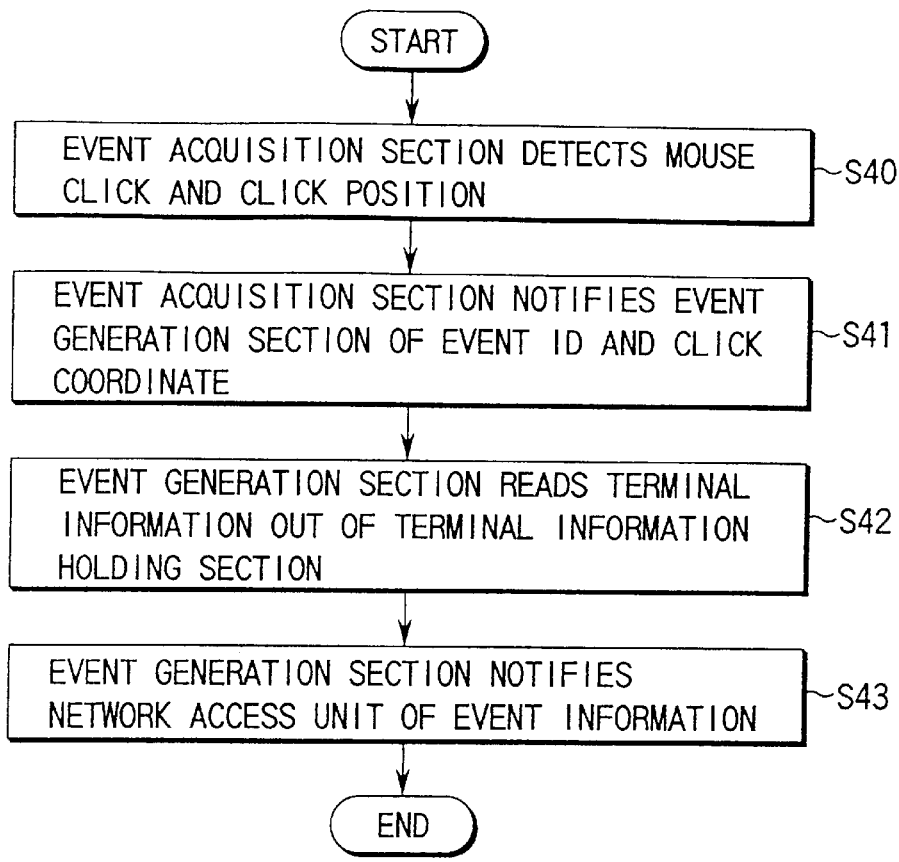
FIG. 16 is a flowchart for explaining a processing operation of an event occurring device.

The method of displaying a reproduced picture on the display unit 2b is not limited to FIG. 3, but can be applied as shown in FIG. 14. The picture displayed on the display unit 2b is only one of the main program, not a sub-picture of the menu. In order to cause an audience's desired event to occur, the audience operates a mouse of the receiving terminal 2 to click a desired position of the picture shown in FIG. 14. A processing operation of the event occurring unit 2d in this case will now be described with reference to the flowchart of FIG. 16.

Assume that a user (audience) of the receiving terminal 2 clicks a castle of an amusement park which is the background of the picture shown in FIG. 14. The event acquisition section 2d-1 of the event occurring unit 2d detects that an event has occurred, by clicking the mouse by the user and detecting the clicked position (of the castle) on the picture (step S40). The type of the event, which can be identified by the ID of the event, that is, the information to be displayed is predetermined, and its corresponding message can be displayed on the picture.

Figure 15:
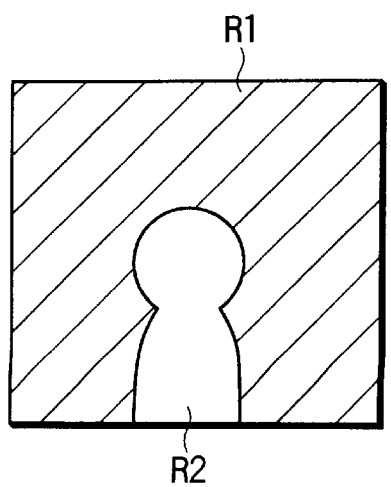
FIG. 15 is a view showing a picture reproduced by the display device of the receiving terminal of the broadcasting system according to the second embodiment of the present invention.

The positional information detected by the event acquisition section 2d-1 can be coordinate information or identification information for roughly identifying a region as shown in FIG. 15. FIG. 15 is a view corresponding to the picture of FIG. 14. For example, region R2 of FIG. 15 corresponding to a person can be preset as a default region which has no information to be displayed even if it is selected by clicking the mouse. Region R1 of FIG. 15 corresponding to the background is one capable of causing a predetermined event by clicking the mouse.

If the event acquisition section 2d-1 detects that an event occurs, it notifies the event generation section 2d-2 of an ID of the detected event and clicked positional information (step S41). Being notified of the event ID and positional information, the section 2d-2 reads channel information, terminal time, terminal ID, terminal location, return destination (self-terminal) information, etc. of a currently-received program from the terminal information holding section 2d-3 (step S42), and notifies the network access unit 2c of the read terminal information, event ID and positional information (step S43).

Figure 9:
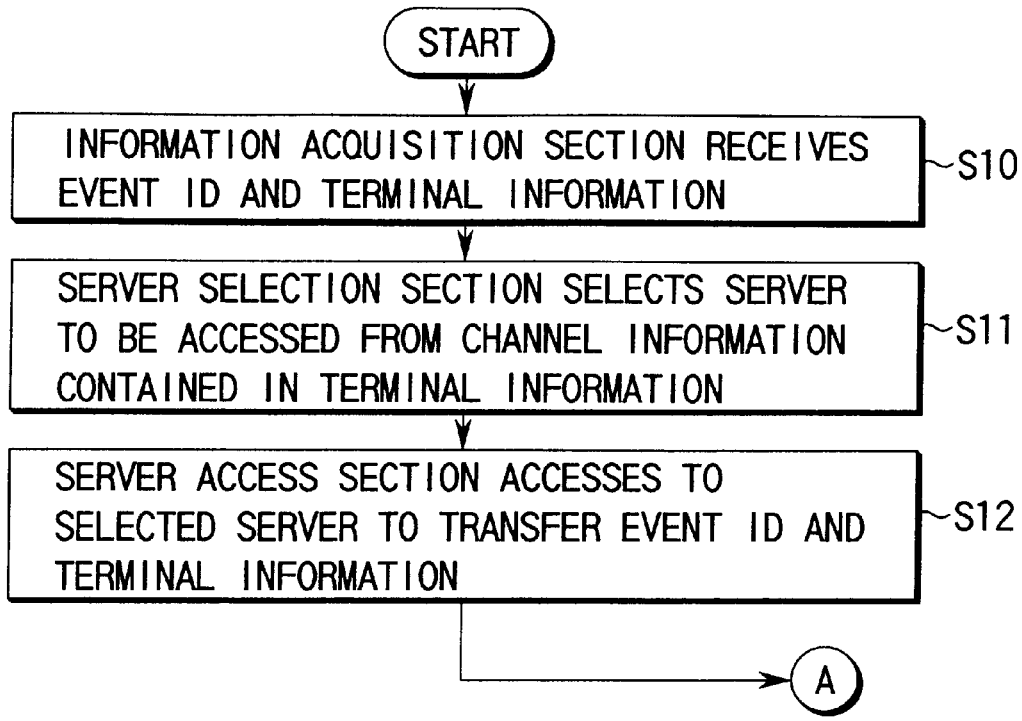
FIG. 9 is a flowchart of a processing operation of the network access device in order to explain a series of operations of the broadcasting system according to the first embodiment of the present invention.
Figure 10:
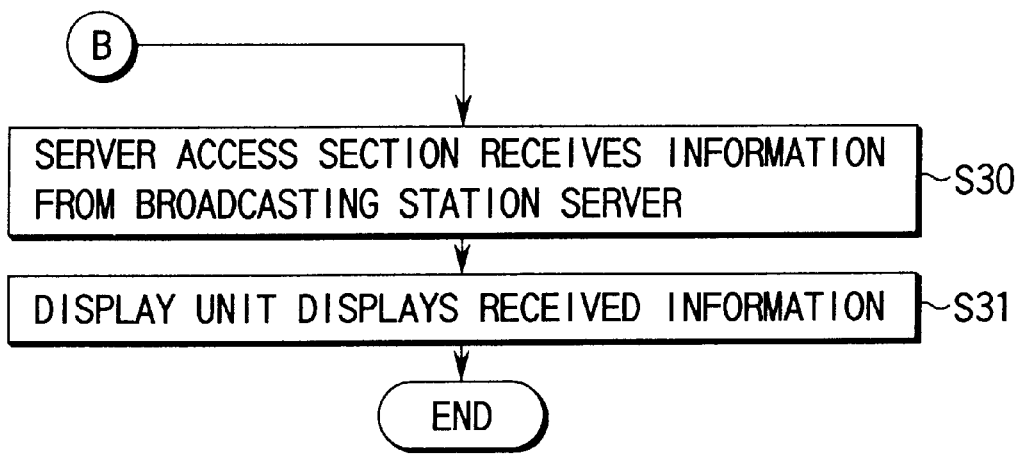
FIG. 10 is a flowchart of a processing operation of the network access device in order to explain a series of operations of the broadcasting system according to the first embodiment of the present invention.

The subsequent processing operations of the broadcasting system are the same as described with reference to FIGS. 9 to 11. However, the information transmitted from the network access unit 2c to the broadcasting station server 1c includes the event ID, terminal information, and clicked positional information on the picture.

Figure 17:
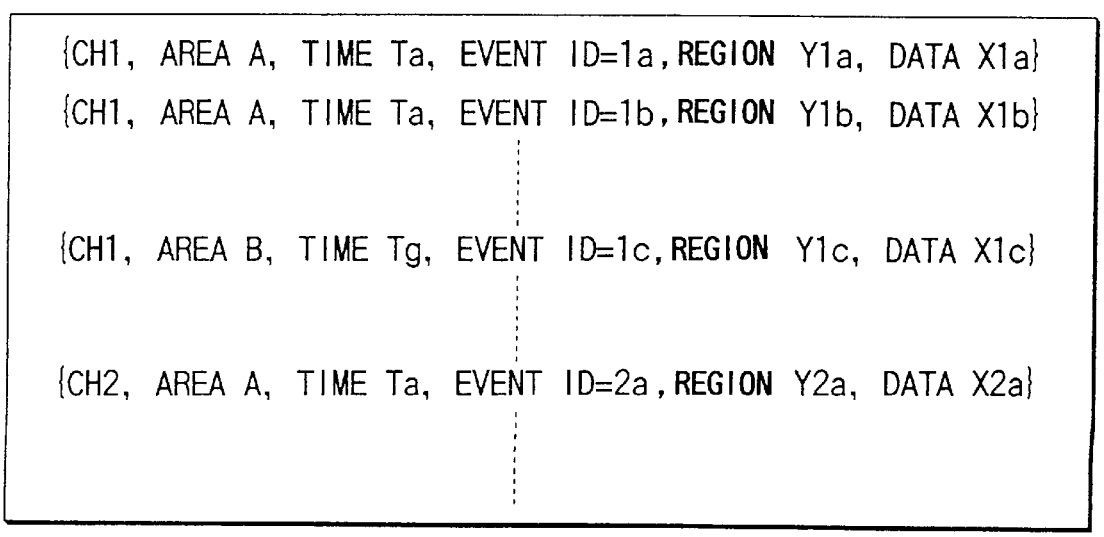
FIG. 17 is a view illustrating information stored and controlled in a program database of a broadcasting station server.

The information stored in the program database 1b of the broadcasting station 1 is also different from that in FIG. 7. In the case of FIG. 17, the program database 1b stores positional information (e.g., regions Y1a, Y1b, . . . in FIG. 17) on the picture as well as the event ID in the form of a list so as to serve as retrieval keys. Otherwise, in place of the event ID of FIG. 17, positional information on the picture can be stored in the form of a list so as to serve as a retrieval key.

The positional information stored as a retrieval key in the program database 1b need not be coordinate information. For example, it can be replaced with information roughly representing a range of a region, thus retrieving a region the range of which includes a position notified by the receiving terminal 2. If the positional information notified by the receiving terminal 2 is identification information of the region, it can be a retrieval key.

Figure 11:
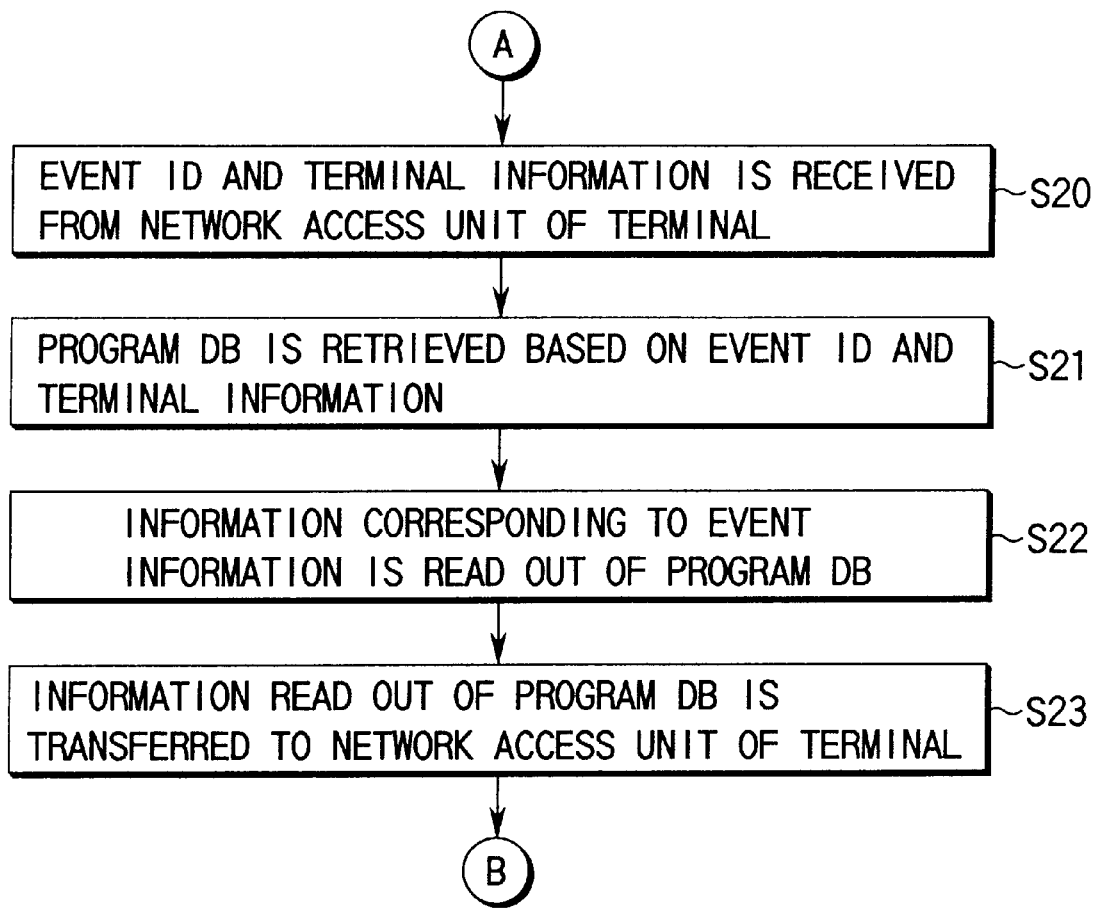
FIG. 11 is a flowchart of a processing operation of the broadcasting station server in order to explain a series of operations of the broadcasting system according to the first embodiment of the present invention.

Referring to the flowchart of FIG. 11, if the broadcasting station server 1c transmits information, which is read out of the program database 1b and corresponds to a clicked position, to the receiving terminal 2 which is event notification originator, the terminal 2 is operated according to steps S30 and S31.

For example, like in FIG. 12, the display unit 2b has a message display window 13 opened under the picture of a program, and this window 13 displays a message "This is a main castle of Tokyo XXX land. Do you see its information at once." and command buttons indicative of "YES" and "NO". If the audience clicks the command button of "YES", the screen of the display unit 2b is divided and, for example, like in FIG. 13, an information display window 14 is displayed next to the picture of the program, and the information received from the broadcasting station server 1c is displayed on the window 14.

When the audience clicks the command button of "NO", the same operation as described regarding the first embodiment.

(Third Embodiment)

Figure 18:
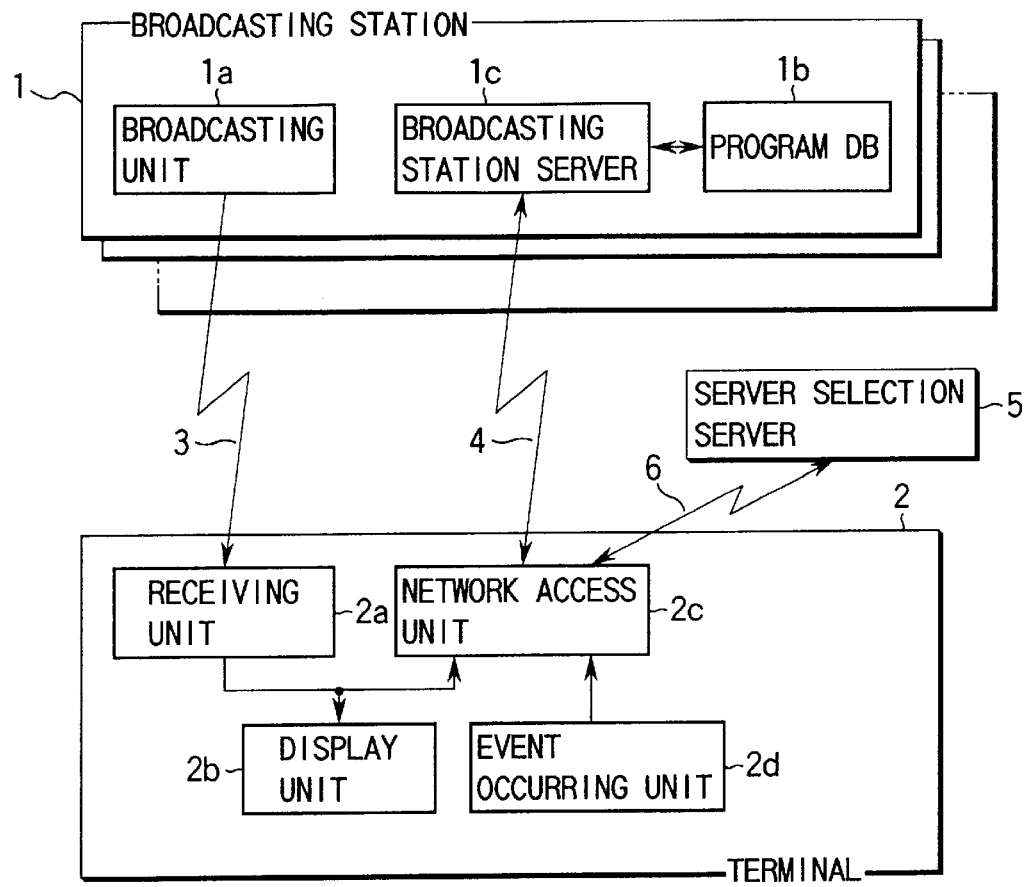
FIG. 18 is a block diagram of a broadcasting system according to a third embodiment of the present invention.

FIG. 18 is a block diagram illustrating a broadcasting system according to a third embodiment of the present invention. In this figure, the same constituents as those of FIG. 1 are denoted by the same reference numerals and their descriptions are omitted.

The third embodiment differs from the first embodiment in that the network access unit 2c is provided with a server selection server 5. The server 5 has a table storing channel information and its corresponding destination information of a broadcasting station server, as shown in FIG. 6, and is connected to an information network so as to be connectable to a receiving terminal 2 of each audience. In other words, when the need arises, the server 5 is connected between a broadcasting station 1 and each audience's house through a communication line 6 of a two-way information network line, such as a telephone line and an ISDN line, whose band is narrower than that of an information transmission path 3. Like the communication line 4, the communication line 6 can be connected between the broadcasting station 1 and each audience's house through, e.g., an internet.

Figure 19:
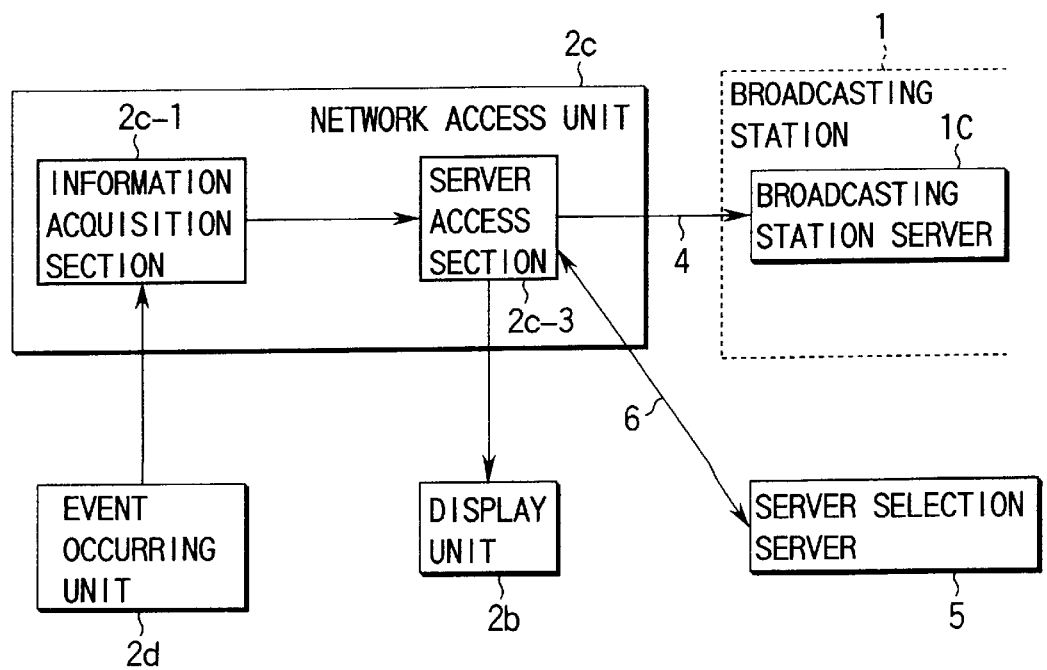
FIG. 19 is a block diagram showing another example of the constitution of the network access device of the receiving terminal.

FIG. 19 is a block diagram showing the constitution of the network access unit 2c. In this figure, the same constituents as those of FIG. 5 are indicated by the same reference numerals, and their descriptions are omitted. The network access unit 2c of FIG. 19 is not provided with a server selection section 2c-2 but connected to an information acquisition section 2c-1 and a server access section 2c-3.

Figure 20:
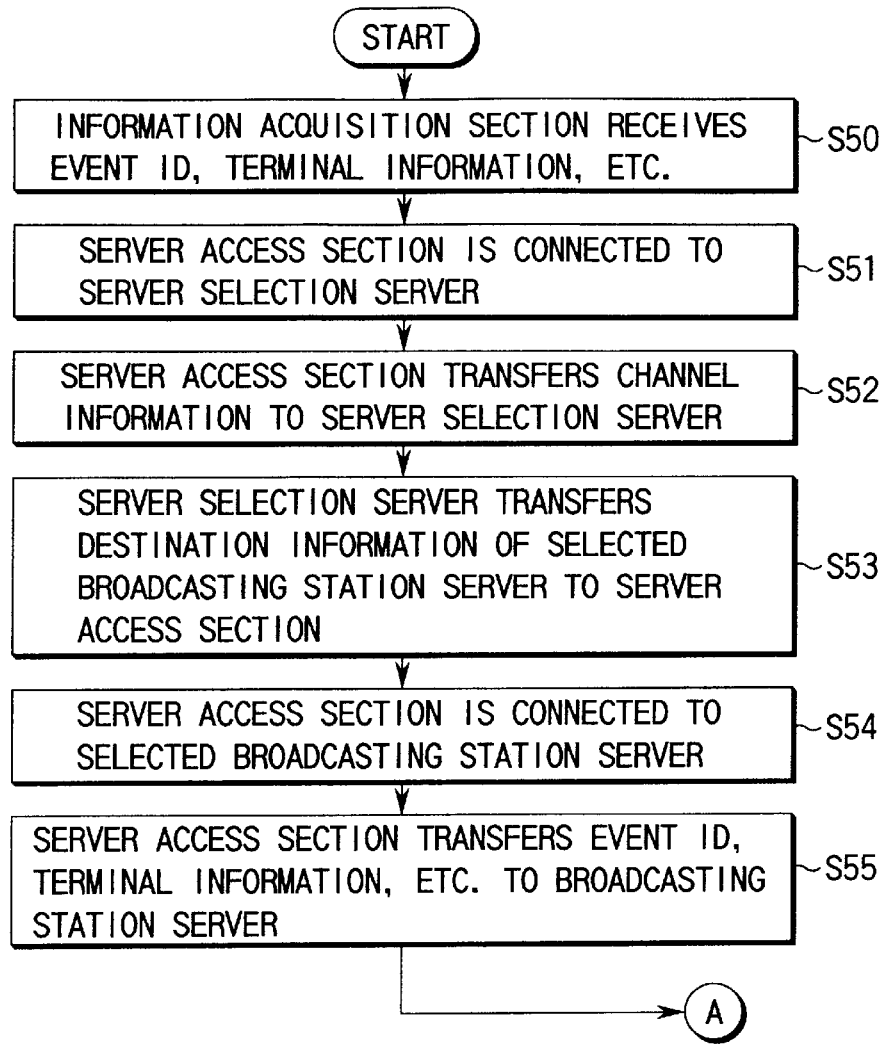
FIG. 20 is a flowchart for explaining a processing operation of the network access device.

A processing operation of the network access unit 2c having the constitution shown in FIG. 19, will now be described with reference to the flowchart of FIG. 20.

If the information acquisition section 2c-1 receives an event ID, terminal information and the like from an event occurring unit 2d, they are supplied to the server access section 2c-3 (step S50). Upon receiving the event ID, terminal information, etc. from the information acquisition section 2c-1, the server access section 2c-3 accesses to the server selection server 5 to transmit channel information included in the terminal information via the communication line 6 (steps S51 and S52). Upon receiving the channel information, the server 5 selects a broadcasting station server 1c from the table shown in FIG. 6 to obtain destination information of the server 1c and return it to the server access section 2c-3 via the communication line 6 (step S53). The server access section 2c-3 accesses to the broadcasting station server 1c selected based on the destination information transmitted from the server selection server 5, and transmits the event ID, terminal information, etc. to the server 5 through the communication line 6 (steps S54 and S55).

Figure 21:
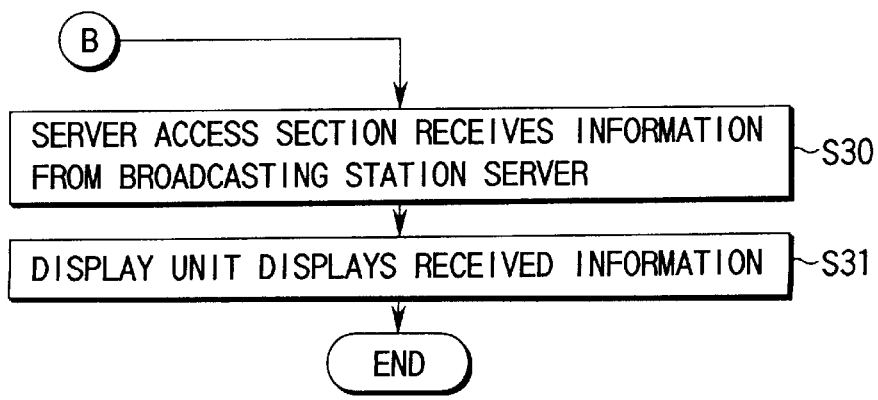
FIG. 21 is a flowchart for explaining a processing operation of the network access device.

Next, the processing operation of step S20 of FIG. 11 and its subsequent operations are performed. If the information is transmitted from the selected broadcasting station server 1c to the server access section 2c-3 through the communication line 4 (step S30 of FIG. 21), it is sent to a display unit 2b and displayed thereon (step S31).

Consequently, according to the broadcasting system of the third embodiment, since the server selection server 5 has a database, the management of data can be centralized.

(Fourth Embodiment)

Figure 22:
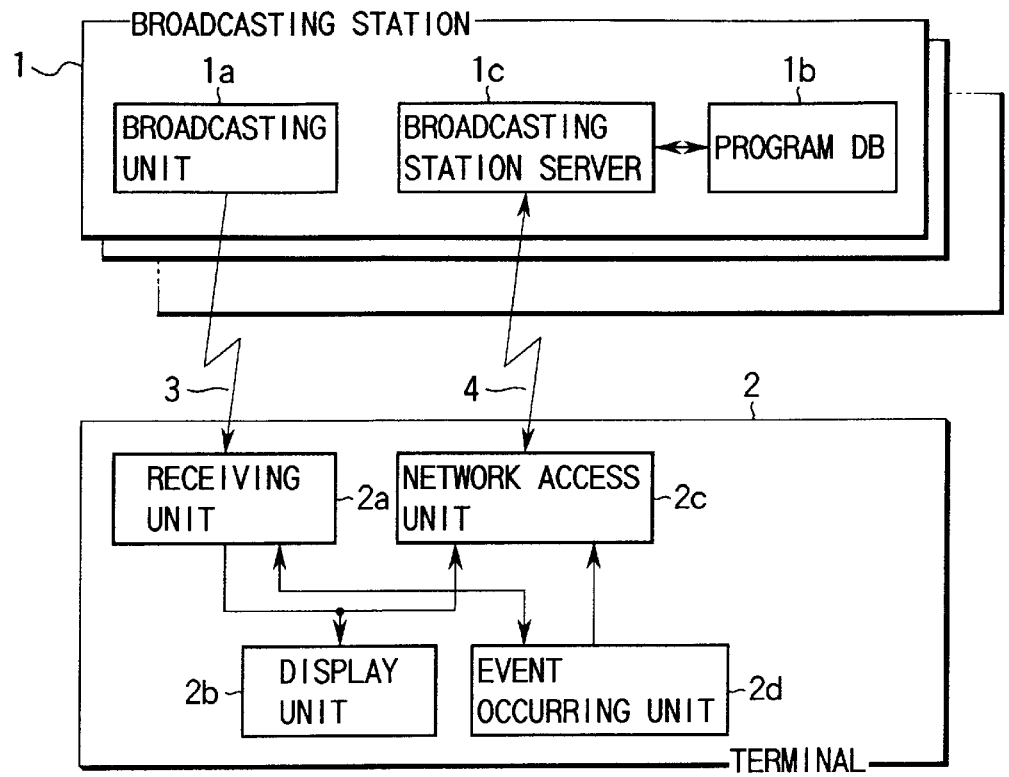
FIG. 22 is a block diagram of a broadcasting system according to a fourth embodiment of the present invention.

FIG. 22 is a block diagram illustrating a broadcasting system according to a fourth embodiment of the present invention. In this figure, the same constituents as those of FIG. 1 are denoted by the same reference numerals and their descriptions are omitted.

The fourth embodiment differs from the first embodiment in constitution of receiving unit 2a. Furthermore, a video signal of a program is multiplexed with a system status information about the video signal, such as parameters indicating distribution time of the program based on the standard time of broadcasting station 1 and frame numbers of a picture, and the multiplexed signal is distributed; accordingly, information is transferred between the receiving unit 2a and event occurring unit 2d.

Figure 23:
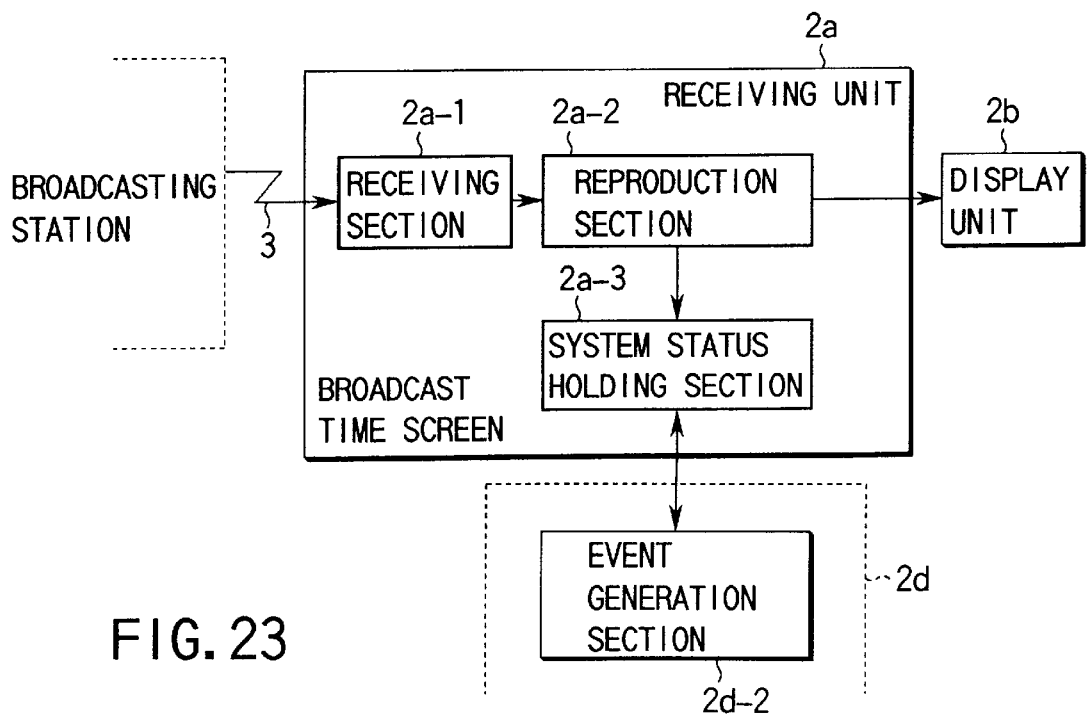
FIG. 23 is a block diagram of a receiving unit of the broadcasting system according to the fourth embodiment of the present invention.

FIG. 23 is a block diagram showing a receiving unit of the broadcasting system of the fourth embodiment. In this figure, the same constituting elements as those of FIG. 2 are denoted by the same reference numerals and their descriptions are omitted.

If a receiving unit 2a-1 receives a multiplexed video signal of system status information from a broadcasting unit 1a of the broadcasting station 1, a reproduction section 2a-2 separates the system status information from the video signal and reproduces the video signal in accordance with its characteristic. The video signal is transferred to a display unit 2b, while the system status information is transmitted to a system status holding section 2a-3. The system status holding section 2a-3 stores system status information such as broadcasting station time and frame numbers of a picture, and updates the stored system status information by the system status information transferred from the reproduction section 2a-2.

If an event generation section 2d-2 of an event occurring unit 2d receives an event ID from an event acquisition section 2d-1 of the unit 2d, it reads terminal information out of a terminal information holding section 2d-3, and accesses to the system status holding section 2a-3 to read system status information at this time. The event generation section 2d-2 transmits the event ID, terminal information, and system status information to the network access unit 2c. If such information is transmitted to a broadcasting station server 1c through the network access unit 2c, the server 1c retrieves program database 1b using not terminal time but broadcasting station time contained in the system status information as one of retrieval keys. In general, terminal time held in the receiving terminal 2 of each audience's house is slightly different from broadcasting station time which is defined by the broadcasting station 1.

According to the fourth embodiment, since, in each receiving terminal 2, time when an event occurs is set using broadcasting station time as a standard, the event occurring time in the broadcasting station server 1c, which serves as a retrieval key for retrieving information corresponding to a notified event, can exactly be known.

(Fifth Embodiment)

Figure 24:
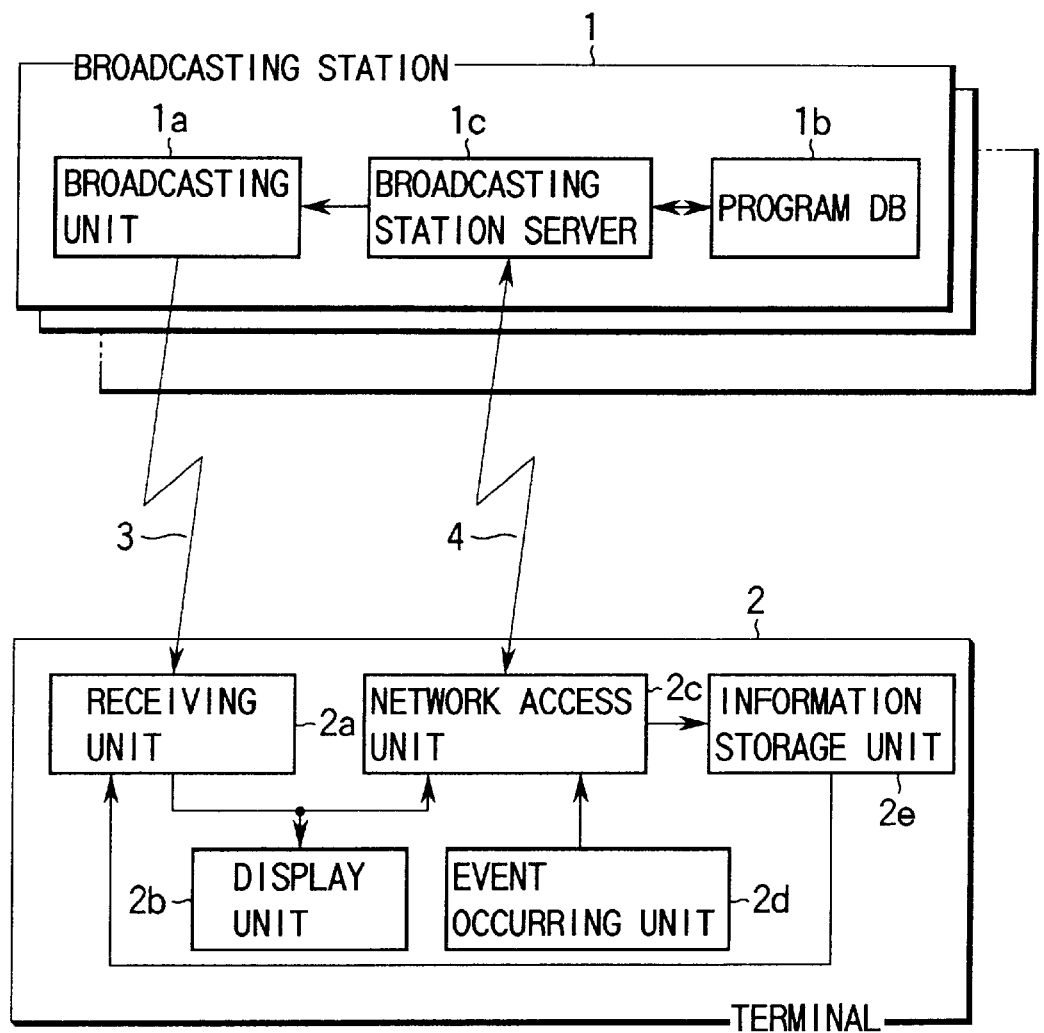
FIG. 24 is a block diagram of a broadcasting system according to a fifth embodiment of the present invention.

FIG. 24 is a block diagram illustrating a broadcasting system according to a fifth embodiment of the present invention. In this figure, the same constituents as those of FIG. 1 are denoted by the same reference numerals and their descriptions are omitted.

The fifth embodiment differs from the first embodiment mainly in constitution of receiving unit 2a. In the fifth embodiment, a large audience disperses and accesses to the center, and the distribution of information from the center to each audience at audience's request is controlled in accordance with an amount of the information. Terminal control information for controlling the receiving terminal 2 of each audience is multiplexed with a video signal of a program, and the multiplexed signal is distributed from a broadcasting station 1.

Figure 25:
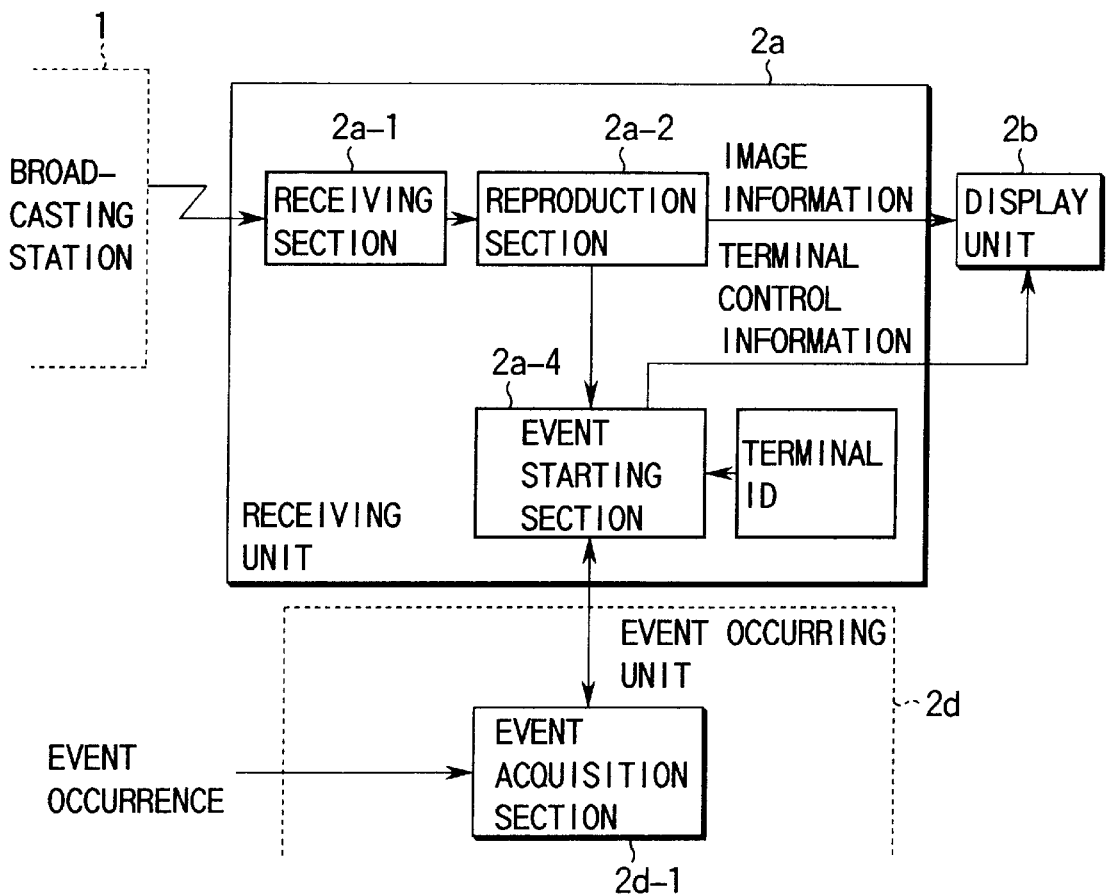
FIG. 25 is a block diagram of a receiving unit of the broadcasting system according to the fifth embodiment of the present invention.

FIG. 25 is a block diagram of the receiving unit of the broadcasting station of the fifth embodiment. In this figure, the same constituents as those of FIG. 2 are denoted by the same reference numerals and their descriptions are omitted.

Referring to FIG. 25, If a receiving unit 2a-1 receives a multiplexed video signal of terminal control information from a broadcasting unit 1a of the broadcasting station 1, a reproduction section 2a-2 separates the terminal control information from the video signal and reproduces the video signal in accordance with its characteristic. The video signal is transferred to a display unit 2b, while the terminal control information is transmitted to an event starting section 2a-4. The terminal control information includes control information about an event which is caused to occur by the receiving terminal 2 such as a command button selectable by each audience, as well as control information for controlling the receiving terminal 2 of each audience on the broadcasting station side.

Based on the terminal control information, the event starting section 2a-4 performs operations of displaying a command button on the display unit 2b, and, when the event occurs by clicking a mouse, instructing an event acquisition section 2d-1 whether an event is driven or not and providing it with an event ID. In short, when the event starting section 2a-4 receives terminal control information from the broadcasting station 1, it controls an event in the receiving terminal based on the terminal control information.

If the receiving unit 2a is constituted as shown in FIG. 25 to multiplex the terminal control information with a video signal transmitted from the broadcasting station 1, a control processing can effectively be executed in the following two cases 1) and 2):

1) First control processing for controlling a large amount of information transmitted from the broadcasting station 1 to each receiving terminal 2 through a communication line 4.

In this case, the network access unit 2c can be controlled by causing a terminal event to occur on the broadcasting station side. Therefore, the audience causes the receiving terminal 2 to access to the broadcasting station server 1c before the event occurs (e.g., at the start of a broadcast), and information has been already transferred from the broadcasting station server 1c to the receiving terminal 2 when the event is notified from the audience to the receiving terminal 2.

Figure 26:
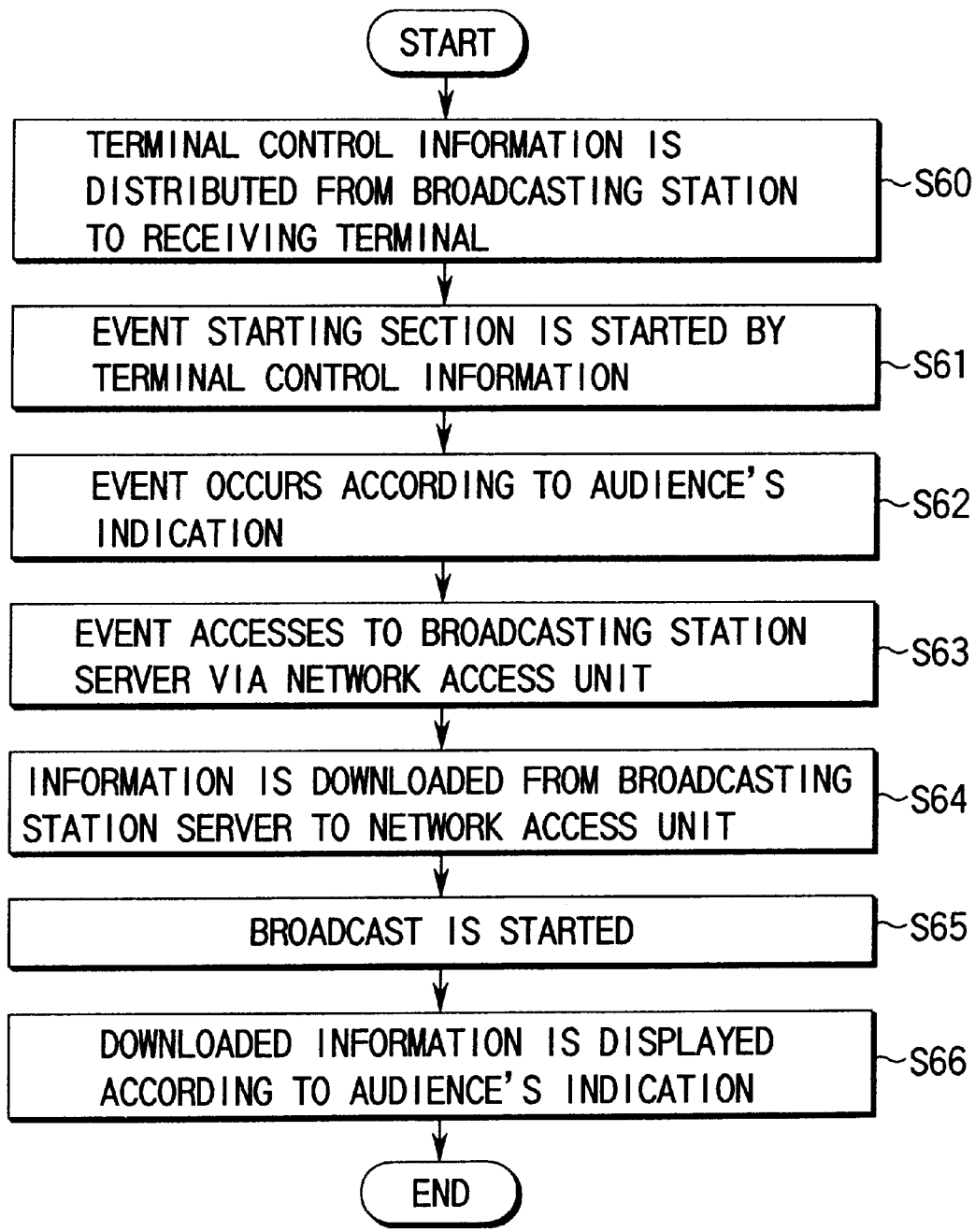
FIG. 26 is a flowchart for explaining a control processing (first control processing) when an amount of information to be transmitted from the broadcasting station to each receiving terminal through a two-way communication line is large.

The outline of the first control processing will be described with reference to the flowchart of FIG. 26.

First the broadcasting station 1 distributes a multiplexed video signal of terminal control information to the receiving terminal 2 of each audience, e.g., at the start of a broadcast (step S60). The terminal control information includes buttons (e.g., "YES" and "NO" buttons) for asking an audience whether he or she wishes to know detailed information of a program to be broadcast, and a message for operating the buttons when the need arises.

When the receiving section 2a-1 of the receiving unit 2a of the receiving terminal 2 receives the video signal from the broadcasting station 1, the terminal control information separated from the video signal when the video signal is reproduced by the reproduction section 2a-2, is supplied to an event starting section 2a-4 to driven the section 2a-4. The event starting section 2a-4 controls the display unit 2b such that the button and message contained in the terminal control information is displayed thereon, and notifies the event acquisition section 2d-1 of an event ID (step S61).

Looking at a message displayed on the display unit 2b, an audience clicks the button "YES" when he or she wishes to know the detailed information of the program and clicks the button "NO" when he or she does not. The event acquisition section 2d-1 detects it, and a program information acquisition event occurs (step S62).

If the button "YES" is clicked to cause the program information acquisition event, the broadcasting station server 1c is notified of the event through the network access unit 2c and communication line 4 (step S63).

Based on the event ID, terminal information, and the like transmitted from the receiving terminal 2, the broadcasting station server 1c reads the corresponding program detailed information out of the program database 1, and downloads it to the network access unit 2c via the communication line 4 (step S64). The downloaded program detailed information is stored in an information storage unit 2e included in the receiving terminal 2.

After that, when the actual broadcast of the program is started (step S65), the event starting section 2a-4 is started by the terminal control information multiplexed with a video signal of the program. If the terminal control information includes a button (e.g. "program information display" button) for causing an event to display the program detailed information and message information for operating the button when necessary, the event starting section 2a-4 causes them to be displayed on the display unit 2b.

When the audience wishes to know the program information from the message displayed on the display unit 2b, he or she clicks the "program information display" button. It is detected by the event acquisition section 2d-1 and notified to the event starting section 2a-4. The section 2a-4 reads the downloaded information out of the information storage unit and causes it to be displayed on the display unit 2b (step S66).

As described above, even when a large amount of information is transmitted from the broadcasting station 1 to each receiving terminal 2 through the communication line 4 at audience's request during the broadcast, the terminal control information is multiplexed with a video signal and distributed to each audience's house, e.g., before the broadcast starts. At the receiving terminal of each audience, the event starting section 2a-4 is started by the terminal control information multiplexed with the received video signal, and the audience inquires whether the program information acquisition event occurs or not.

Next, the program information is previously downloaded from the broadcasting station server 1c to the information storage unit 2e of the receiving terminal 2 of an audience who hope that an event occurs through the communication line 4. When the main program is started and a program information acquisition event is caused to occur by the audience, the program information downloaded to the information storage unit is read out under the control of the event starting section 2a-4 and displayed on the display unit 2b.

Consequently, even though a large amount of information is transferred through the communication line 4, the audience can enjoy a program and its program information in real time without lengthening a response time required from when the event is caused to occur by the audience until information corresponding to the event is displayed on the display unit 2b.

2) Second control processing for lessening an amount of access localized on the broadcasting station server 1c from the receiving terminal 2 at a specific time during the broadcast.

In this case, the terminal control information distributed from the broadcasting station 1 through the information transmission path 3 together with a video signal, includes control information about an event occurring at the receiving terminal and terminal designation information for designating a receiving terminal at which an event can be caused to occur.

The terminal designation information is used to designate the receiving terminal 2 in units of predetermined number by, for example, sequentially updating the last figure (or the last two figures) of the terminal ID, such as "0", "1", "2", . . . and "9".

When the receiving terminal 2, which is allowed to cause an event by the terminal designation information, accesses to the broadcasting station server 1c of the broadcasting station 1 via the communication line 4 (when the terminals 2 notify the server 1c of an event), and information corresponding to the event is transferred to the receiving terminal 2 through the communication line, the number of accessing receiving terminals 2 is counted. When the count value reaches a predetermined number, the broadcasting station server 1c notifies the broadcasting unit 1a of it. Upon receiving the notification from the broadcasting station server 1c, the broadcasting unit 1a updates, e.g., the last figure of the terminal ID, changes the terminal designation information, multiplexes terminal control information including the updated information with a video signal, and distributes it to the audience. The terminal designation information can be updated every predetermined time as well as when the number of receiving terminals 2 which have accessed to the broadcasting station server 1c reaches a predetermined number.

Figure 27:
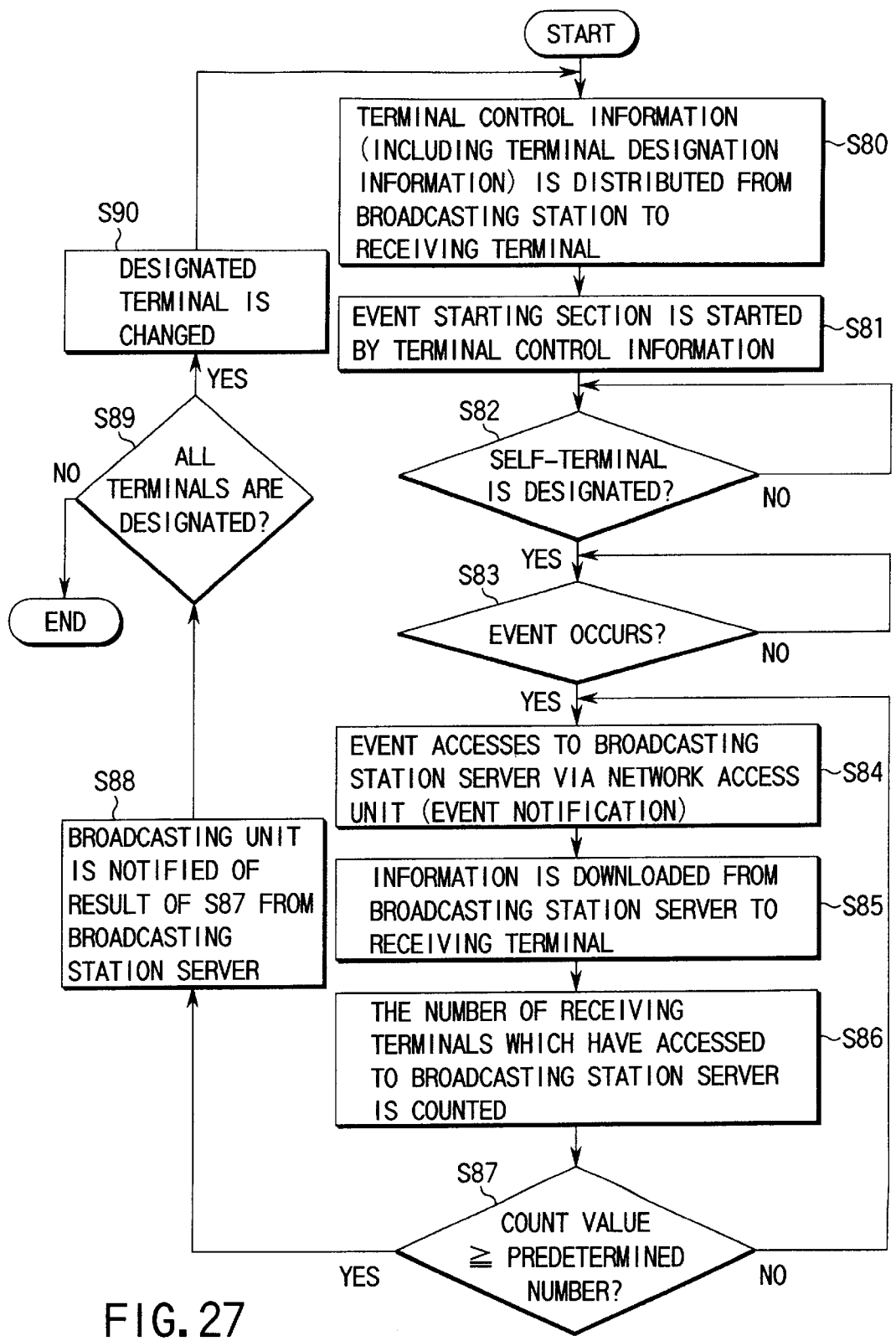
FIG. 27 is a flowchart for explaining a control processing (second control processing) to lessen an amount of access from receiving terminals to the broadcasting station server when it is anticipated that the access is localized at a specific time while a program is on the air.

The outline of the second control processing will be described with reference to the flowchart shown in FIG. 27.

First, the broadcasting station 1 multiplexes terminal control information, which includes terminal designation information for designating the receiving terminal 2 whose ID has the last figure of "0", with a video signal of the main program and distributes it to the receiving terminal 2 (step S80).

If the receiving section 2a-1 of the receiving unit 2a of the receiving terminal 2 receives the video signal from the broadcasting station 1, terminal control information separated from the video signal when the video signal is reproduced by the reproduction section 2a-2, is supplied to the event starting section 2a-4, and the section 2a-4 is started (step S81).

The event starting section 2a-4 compares a previously-stored terminal ID and terminal designation information to check whether the self-terminal is designated or not (step S82). For example, when the last figure of the terminal ID is a value designated by the terminal designation information, the event starting section 2a-4 controls the display unit 2b so as to display an event occurring button and a message contained in the terminal control information, and notifies the event acquisition section 2d-1 of the event occurring unit 2d of an event ID.

Looking at a message displayed on the display unit 2b, an audience clicks the button "YES" when he or she wishes to know the detailed information of the program and clicks the button "NO" when he or she does not. The event acquisition section 2d-1 detects it, and a program information acquisition event occurs (step S83).

If the button "YES" is clicked to cause the program information acquisition event, the broadcasting station server 1c is notified of the event through the network access unit 2c and communication line 4 (step S84).

Based on the event ID, terminal information, and the like transmitted from the receiving terminal 2, the broadcasting station server 1c reads information corresponding to the event out of the program database 1, and downloads it to the network access unit 2c via the communication line 4 (step S85). The downloaded program detailed information is displayed on the display unit 2b.

When the information is downloaded to the network access unit 2c, the broadcasting station server 1c counts the number of receiving terminals which have accessed thereto (step S86). If the count value reaches a predetermined number (step S87), the server 1c notifies the broadcasting unit 1a of it (step S88). Upon receiving this notification, the broadcasting unit 1a updates the last figure of the terminal ID to, for example, "1" and changes the terminal designation information (steps S89 and S90). The flow returns to step S80. The changed terminal designation information is multiplexed with a video signal of the main program and distributed to each audience.

The above-described processing is continued until all the receiving terminals 2 are designated, e.g., until all the last figures of the terminals Ids are designated.

Even when it is expected that access is localized on the broadcasting station server 1c in a specific time slot, if a receiving terminal 2 capable of causing an event in units of predetermined number by the terminal designation information, the access to the broadcasting station 1c can reliably be dispersed and therefore its localization can be relaxed.

(Sixth Embodiment)

Another example of a method for using the broadcasting system having the constitution as shown in FIGS. 1, 8, 22 and 24. In the foregoing broadcasting system, information is transferred from the broadcasting station 1 mainly at audience's request. It is possible to send out questionnaires to the audience using the broadcasting system.

Figure 28:
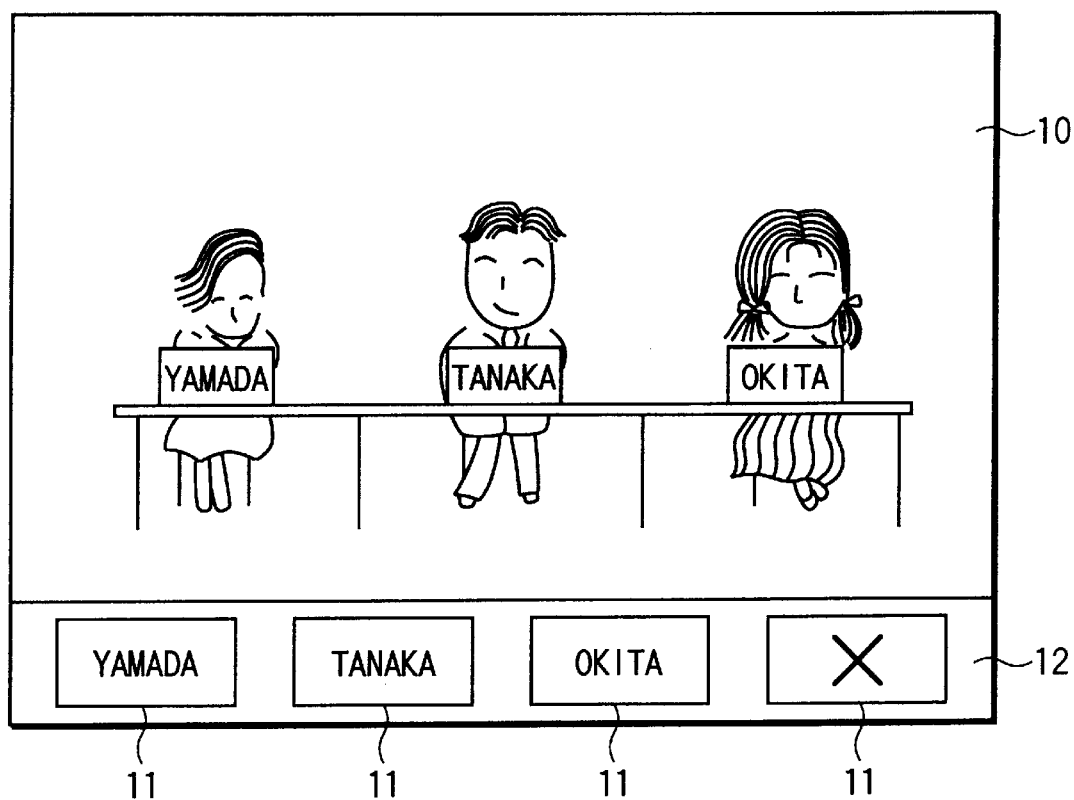
FIG. 28 is a view illustrating an example of display of a receiving terminal when questionnaires are sent out to the audience in order to explain one of uses of the broadcasting system of the present invention.

Assuming that a debate held by several debaters is broadcast, a picture is displayed on the display unit 2b of the receiving terminal 2 of each audience, as illustrated in FIG. 28. As in FIG. 3, the picture is constituted of a main picture 10 of the main program and a sub-picture 12 of the menu indicating the list of buttons 11.

In the menu of the buttons 11 displayed as the sub-picture 12, the audience clicks a button with a name of one of the debaters with whom he or she agrees, and does a button marked with a cross (×) when the audience does not agree with any of the debaters. Then, as described above, for example, terminal information, positional information of the clicked picture, etc. are transmitted from the audience's receiving terminal 2 to the broadcasting station server 1c through the communication line 4 (event notification). In the server 1c, the audience's opinions are sorted out by the positional information transmitted from the respective receiving terminals 2 and registered in the program database 1b. After that, in the broadcasting station 1, the opinions registered in the program database 1b are retrieved to compile statistics thereof or the like, thus causing a program to reflect the opinions.

According to the broadcasting system of the present invention, whenever the broadcasting station server 1c is notified of an event from each receiving terminal 2, its log is recorded. Thus, the degree of interest in a broadcast program, etc. can be obtained numerically and exactly, and beneficial information can be provided to broadcasting companies, program planners, sponsors, etc. As described above, according to the present invention, the VOD system can easily be constituted using an existent broadcasting system, a communication network such as an internet.

Furthermore, both dispersion of accesses from an audience to the center and distribution of information from the center to the audience at audience's request in accordance with an amount of information, can easily be controlled.

In the foregoing embodiments, programs for executing a computer can be written to a recording medium such as a magnetic disk (floppy disk, hard disk, etc.), an optical disk (CD-ROM, DVD, etc.), and a semiconductor memory, and transmitted through a communication medium. In this case, a terminal computer or a computer of the broadcasting station according to the embodiments of the present invention, reads the programs recorded in the above recording medium, and executes the above processing by controlling its operation by the programs.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A broadcast system comprising:
   at least one broadcast station including a broadcast device which broadcasts video programs via a one-way network and a broadcast server which transmits information data related to the video programs via a two-way communication network; and
   terminal devices which receive the video programs broadcast from said at least one broadcast station, each of the terminal devices having a display which displays a selected one of the video programs received, an event occurring circuit which generates an event in response to a manual operation by a user of one of the terminal devices, and a network access circuit which transmits an event identification data, a time information at which the event is generated, and a channel information of the selected one of the video programs displayed to the broadcast server via the two-way communication network,
   wherein when said broadcast server receives the event identification data, the time information, and the channel information from one of the terminal devices, said broadcast server transmits the information data related to the selected one of the video programs to the one of the terminal devices and when said one of the terminal devices receives the information data, said one of the terminal devices changes a display content of said display in accordance with the information data received.

2. The system according to claim 1, wherein the video program comprises main program information indicative of a picture of a program and sub-program information displayed on at least part of the picture of the program and indicating a picture of a menu of the picture of the program.

3. The system according to claim 1, further comprising a selection server having a table in which the channel information and destination information of the server are stored so as to correspond to each other and means for acquiring the destination information corresponding to the channel information, and wherein said one of the terminal devices transmits the channel information based on the destination information acquired.

4. The system according to claim 1, where said network access circuit further transmits return destination information for receiving said information data from the broadcast server and said broadcast server transmits the information data to one of the terminal devices based on the return destination information.

5. The system according to claim 1, wherein said network access circuit comprises a table in which the channel information and destination information of the server are stored so as to correspond to each other and further comprising means for acquiring the destination information corresponding to the channel information by using the table.

6. The system according to claim 1,
wherein each of the video programs includes a parameter relating to a standard time counted by said broadcast station,
and each of said terminal devices further comprises:
means for separating the parameter from the video program received; and
wherein each of said terminal devices transmits the parameter separated to the broadcast server.

7. The system according to claim 1, wherein said two-way communication network is a telephone network.

8. The system according to claim 1, wherein said two-way communication network is an ISDN network.

9. The system according to claim 1, wherein said event occurring circuit generates the event when the user designates a command button displayed on a screen of said display.

10. The system according to claim 1, wherein said two-way communication network is an internet.

11. The system according to claim 1, wherein
said two-way communication network is an internet, and
said network access circuit transmits to said broadcast server an IP address of the terminal which is to be used by said broadcast server to access the terminal.

12. A broadcast reception device comprising:
a display which selectively displays a video program broadcast from a broadcast station via a one-way network or information data related to the video program transmitted from the broadcast station via a two-way communication network,
an event occurring circuit which generates an event relating to the video program displayed in response to a manual operation by a user of the reception device;
a network access circuit which transmits an event identification data, a time information at which the event is generated, and a channel information of the video program displayed to the broadcast station via the two-way communication network to thereby change the information data transmitted from said broadcast station; and
a display controller which changes a display content of said display in accordance with the information data received.

13. The device according to claim 12, wherein the video program comprises main program information indicative of a picture of a program and subprogram information displayed on at least part of the picture of the program and indicating a picture of a menu of the picture of the program.

14. The device according to claim 12, wherein said network access circuit further transmits return destination information for receiving said information data from the broadcast server and said broadcast server transmits the information data to the terminal device based on the return destination information.

15. The device according to claim 12, wherein said network access circuit comprises a table in which the channel information and destination information of the server are stored so as to correspond to each other and further comprising means for acquiring the destination information corresponding to the channel information by using the table.

16. The device according to claim 12, wherein said two-way communication network is a telephone network.

17. The device according to claim 12, wherein said two-way communication network is an ISDN network.

18. The device according to claim 12, wherein said event occurring circuit generates the event when the user designates a command button displayed on a screen of said display.

19. The device according to claim 12, wherein each of the video programs includes a parameter relating to a standard time counted by said broadcast station, said device further comprising:
means for separating tbh parameter from the video program received; and
wherein each of said terminal devices transmits the parameter separated to the broadcast server.

20. The device according to claim 12, wherein said two-way communication network is an internet.

21. The reception device according to claim 12, wherein
said two-way communication network is an internet, and
said network access circuit transmits to said broadcast station an IP address of the broadcast reception device which must be used by the broadcast station in order for the broadcast station to access the broadcast reception device.

22. A communications method comprising:
providing at least one broadcast station including a broadcast device and a broadcast server;
broadcasting video programs via a one-way network from said broadcast device;
transmitting information data related to the video programs via a two-way communication network from said broadcast server;
providing terminal devices;
receiving at the terminal devices the video programs broadcast from said broadcast device;
providing each of the terminal devices with a display;
displaying a selected one of the video programs received at the terminal devices;
providing an event occurring circuit;
generating an event using the event occurring circuit in response to a manual operation by a user of one of the terminal devices;
providing a network access circuit; and
transmitting event identification data, time information at which the event is generated, and channel information of the selected one of the video programs displayed to the broadcast server via the two-way communication network, wherein when receiving the event identification data, the time information and the channel information from one of the terminal devices, said broadcast server transmits the information data related to the selected one of the video programs to the one of the terminal devices and when receiving the information data, said one of the terminal devices changes a display content of said display in accordance with the information data received.

23. The communications method according to claim 22, wherein said two-way communication network is an internet, and said network access circuit transmits to said broadcast server an IP address of the terminal device which is used by said broadcast server to access the terminal device.

24. A communication method comprising:

providing a reception device with a display;

receiving a video program broadcast from a broadcast station via a one -way network or information data related to the video program transmitted from the broadcast station via a two-way communication network at the reception device displaying the received video program broadcast from a broadcast station via a one-way network or information data related to the video program transmitted from the broadcast station via a two-way communication network on said display;

providing an event occurring circuit;

generating an event from the event occurring circuit relating to the video program displayed in response to a manual operation by a user of the reception device;

providing a network access circuit;

transmitting information data including event identification data, time information at which the event is generated, and channel information data of the video program displayed from the network access circuit to the broadcast station via the two-way communication network; and providing a display controller for changing a display content of said display in accordance with the information data received.

* * * * *